US012120488B2

(12) United States Patent
Newton et al.

(10) Patent No.: US 12,120,488 B2
(45) Date of Patent: Oct. 15, 2024

(54) PERSONAL SOUND AMPLIFICATION ARTICLE AND METHOD FOR IMPLEMENTING SAME

(71) Applicants: Victoria C. Newton, East Haddam, CT (US); Ralph T. Campagna, Pomfret Center, CT (US)

(72) Inventors: Victoria C. Newton, East Haddam, CT (US); Ralph T. Campagna, Pomfret Center, CT (US)

( * ) Notice: Subject to any disclaimer, the term of this patent is extended or adjusted under 35 U.S.C. 154(b) by 0 days.

(21) Appl. No.: 17/666,126

(22) Filed: Feb. 7, 2022

(65) Prior Publication Data

US 2022/0159392 A1 May 19, 2022

Related U.S. Application Data

(63) Continuation-in-part of application No. 16/875,305, filed on May 15, 2020, now Pat. No. 11,350,225.

(51) Int. Cl.
*H04R 25/00* (2006.01)
*H04R 25/02* (2006.01)

(52) U.S. Cl.
CPC ............. *H04R 25/65* (2013.01); *H04R 25/02* (2013.01); *H04R 25/402* (2013.01); *H04R 25/60* (2013.01)

(58) Field of Classification Search
CPC .. H04R 25/505; H04R 25/554; H04R 25/602; H04R 25/65; H04R 1/1016; H04R 1/105; H04R 2201/109
USPC .......................................................... 381/313
See application file for complete search history.

(56) References Cited

U.S. PATENT DOCUMENTS

2010/0220841 A1* 9/2010 Holst .................. H04R 25/554 379/52
2010/0309627 A1* 12/2010 Noma .................. H01F 7/0252 361/679.58
2014/0098983 A1* 4/2014 Clow ...................... H04R 1/10 381/381

* cited by examiner

*Primary Examiner* — Phylesha Dabney
(74) *Attorney, Agent, or Firm* — CANTOR COLBURN LLP; Steven M. McHugh

(57) ABSTRACT

A Personal Sound Amplification System is provided includes a Personal Sound Amplification Device (PSAD) which includes a PSAD module body which defines a PSAD module body cavity for containing PSAD electronics, wherein the PSAD electronics include at least one PSAD microphone configured to receive a sound input and generate a microphone signal, a PSAD amplifier configured generate a processed microphone signal and a PSAD speaker configured to receive the processed microphone signal and generate a sound output; an external sound tube, wherein the external sound tube is associated with the PSAD module body; and a jewelry attachment device, wherein the jewelry attachment device is removably associated with the PSAD module body front and configured to magnetically associate with a decorative jewelry cover.

20 Claims, 36 Drawing Sheets

SECTION A-A

CLOSED CONFIGURATION

OPEN CONFIGURATION

PERSONAL SOUND AMPLIFICATION ARTICLE AND METHOD FOR IMPLEMENTING SAME

This application is a Continuation-In-Part Application of U.S. Non-Provisional patent application Ser. No. 16/875,305 filed May 15, 2020 and claims the benefit of priority of the filing date of U.S. Non-Provisional patent application Ser. No. 16/875,305 filed May 15, 2020, the contents of which are incorporated herein by reference in its entirety.

FIELD OF THE INVENTION

The present invention relates generally to hearing aids, and more particularly to a personal sound amplification device configured as an earring.

BACKGROUND OF THE INVENTION

Hearing aids are well known and are useful for a variety of pathologies, including sensorineural hearing loss, conductive hearing loss and single-sided deafness. Typically, the hearing aid candidacy is determined by a licensed individual (such as an audiologist or hearing instrument specialist) who examines the patient to determine the type of hearing loss and fits the hearing aid device to the patient based on the nature and degree of the hearing loss. This is important because the amount of benefit experienced by the user of the hearing aid is multi-factorial, depending on the type, severity, and etiology of the hearing loss, the technology and fitting of the device, and on the motivation, personality, lifestyle, and overall health of the user. It should be appreciated that hearing aids are incapable of correcting hearing loss. Rather, they are used to make sounds more audible so that the sounds can reach the cochlea and auditory nerve, where the cochlea and auditory nerve are able to transmit signals to the brain normally.

Currently, there are many different devices to make sounds more audible to hearing loss patients and they range from body-worn devices to behind-the-ear devices to in-the-ear devices to devices that include a directional microphone. One such example is called a Personal Sound Amplification Device (PSAD) which is a simple device that amplifies sound for a wearer. PSADs are typically used for individuals that have some degree of hearing loss, but whose hearing loss is not severe enough for a hearing aid. The FDA has not approved PSADs as a medical device and classifies PSADs as wearable electronic products for occasional, recreational use by consumers who are not hearing impaired. Other examples include medical devices, or hearing aids, of which there are several different types. Current styles of hearing aids include body worn hearing aids, eyeglass hearing aids, behind the ear (BTE) hearing aids, receiver in the ear canal BTE (RIC) hearing aids, in the canal (ITC) hearing aids, completely in the canal (CIC) hearing aids and out of the ear (OTE) hearing aids. Unfortunately, however, while these current devices do work, there are some deficiencies. For example, while the BTE and RIC styles are the most popular at 80%+ in the marketplace, the initial reaction to the look of the device may seem old fashioned to some consumers. Additionally, the ITE, ITC and CIC hearing aid styles create an occlusion effect and make the wearer's voice sound like it's in a barrel and give a 'plugged up' sensation. This occlusion occurs when the hearing aid wearer's own voice is trapped in the ear canal by the hearing aid blocking the air canal. Another example includes power BTE style of hearing aids which include a larger electronic enclosure to house the receiving and processing electronics. The BTE style typically fits over the ear with an earmold, or earplug located either at the entrance of, or in, the ear canal, wherein the electronics are located behind the ear. Unfortunately, however, these styles are relatively large and more obvious to people who encounter the wearer.

SUMMARY OF THE INVENTION

A Personal Sound Amplification System is provided in accordance with one embodiment of the invention and includes a Personal Sound Amplification Device (PSAD), a receiving module and an external sound tube, wherein the PSAD includes a power module having a power source. The receiving module includes a receiving module body having a module body top and defining a receiving module body cavity for containing module electronics, wherein the receiving module is configured to removably associate with a decorative jewelry cover. Moreover, the external sound tube may be associated with the module body top of the receiving module.

A Personal Sound Amplification System is provided in accordance with another embodiment of the invention and includes a Personal Sound Amplification Device (PSAD) and an external sound tube. The PSAD includes a receiving module having an attaching means for associating with a decorative jewelry cover, and a receiving module body having a module body top and defining a receiving module body cavity for containing module electronics. The external sound tube may be associated with the module body top of the receiving module.

A Personal Sound Amplification System is provided in accordance with yet another embodiment and includes a Personal Sound Amplification Device (PSAD), wherein the PSAD includes, a PSAD module body having a PSAD module body front, a PSAD module body rear, PSAD module body sides, a PSAD module body top and a PSAD module body bottom, wherein the PSAD module body defines a PSAD module body cavity for containing PSAD electronics and PSAD power source; at least one PSAD microphone configured to receive a sound input and generate a microphone signal; a PSAD amplifier configured to receive the microphone signal and generate a processed microphone signal; a PSAD speaker configured to receive the processed microphone signal and generate a sound output; an external sound tube, wherein the external sound tube is associated with the PSAD module body top of the PSAD module body; and a jewelry attachment device, wherein the jewelry attachment device is removably associated with the PSAD module body front and configured to magnetically associate with a decorative jewelry cover.

A Personal Sound Amplification System is provided in accordance with still yet another embodiment and includes a Personal Sound Amplification Device (PSAD), wherein the PSAD includes, a PSAD module body which defines a PSAD module body cavity for containing PSAD electronics, wherein the PSAD electronics include at least one PSAD microphone configured to receive a sound input and generate a microphone signal, a PSAD amplifier configured to receive the microphone signal and generate a process microphone signal and a PSAD speaker configured to receive the processed microphone signal and generate a sound output; an external sound tube, wherein the external sound tube is associated with the PSAD module body; and a jewelry attachment device, wherein the jewelry attachment device is removably associated with the PSAD module body front and configured to magnetically associate with a decorative jewelry cover.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

Figure 1:
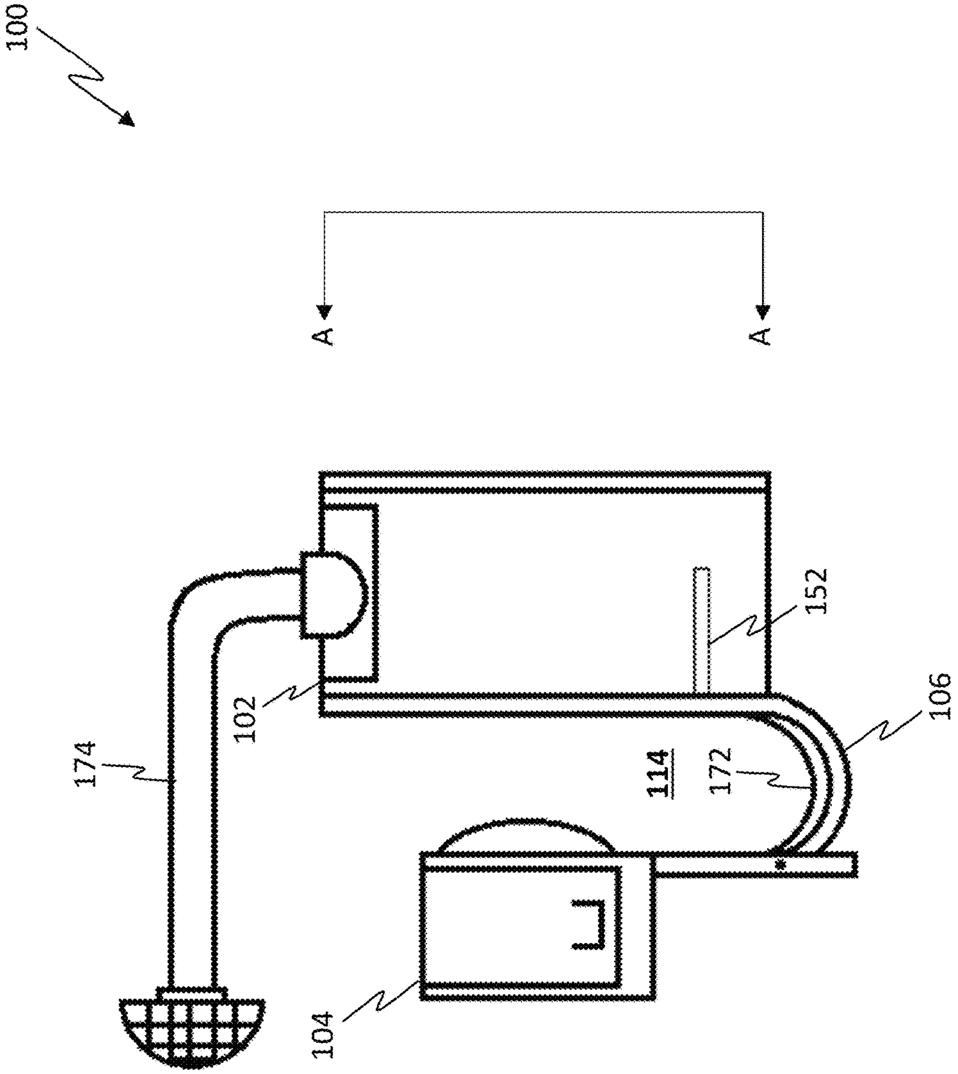
FIG. 1 is a side view of a Personal Sound Amplification Device (PSAD), in accordance with one embodiment of the invention.
Figure 2A:
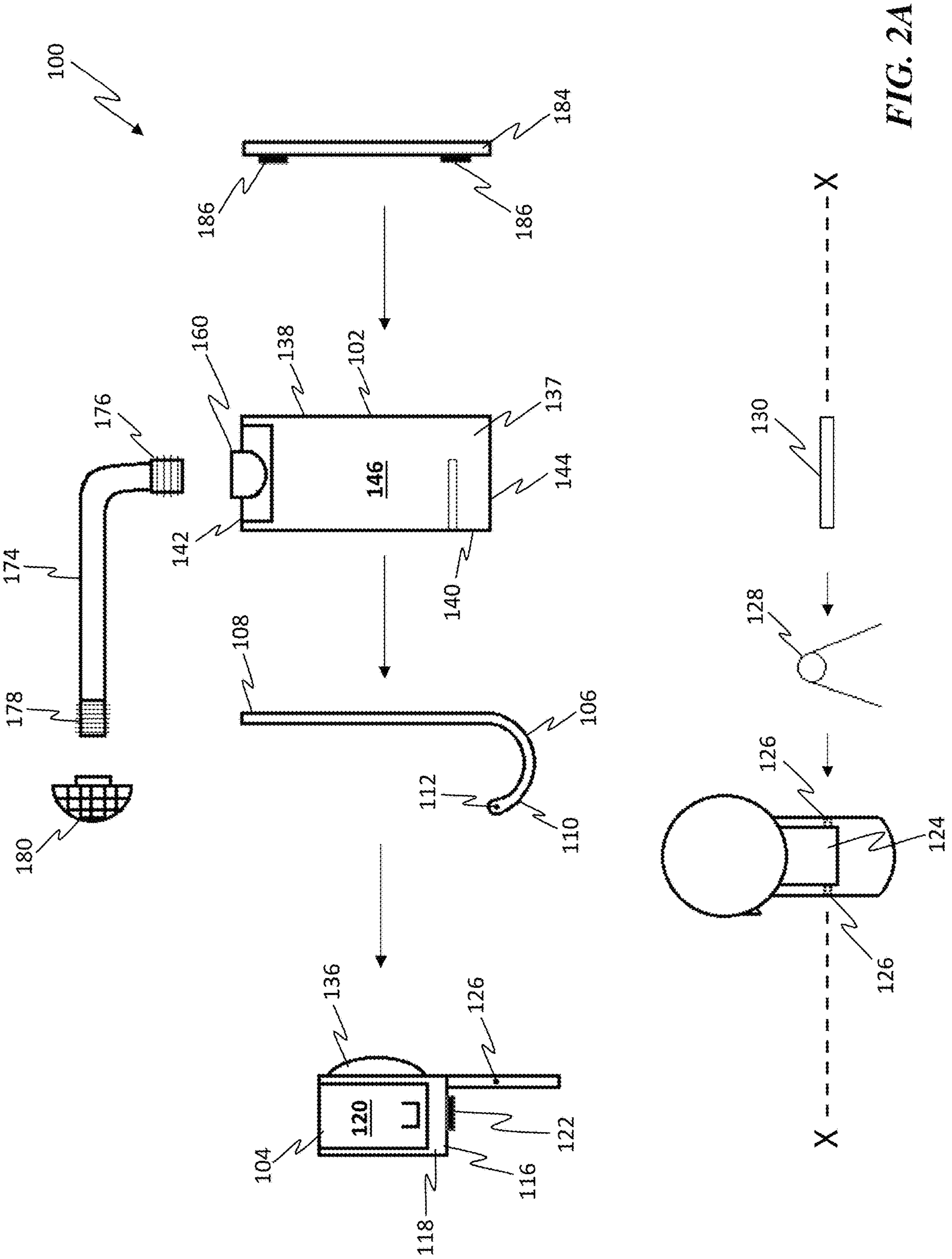
FIG. 2A is an exploded view of the PSAD of FIG. 1.
Figure 2B:
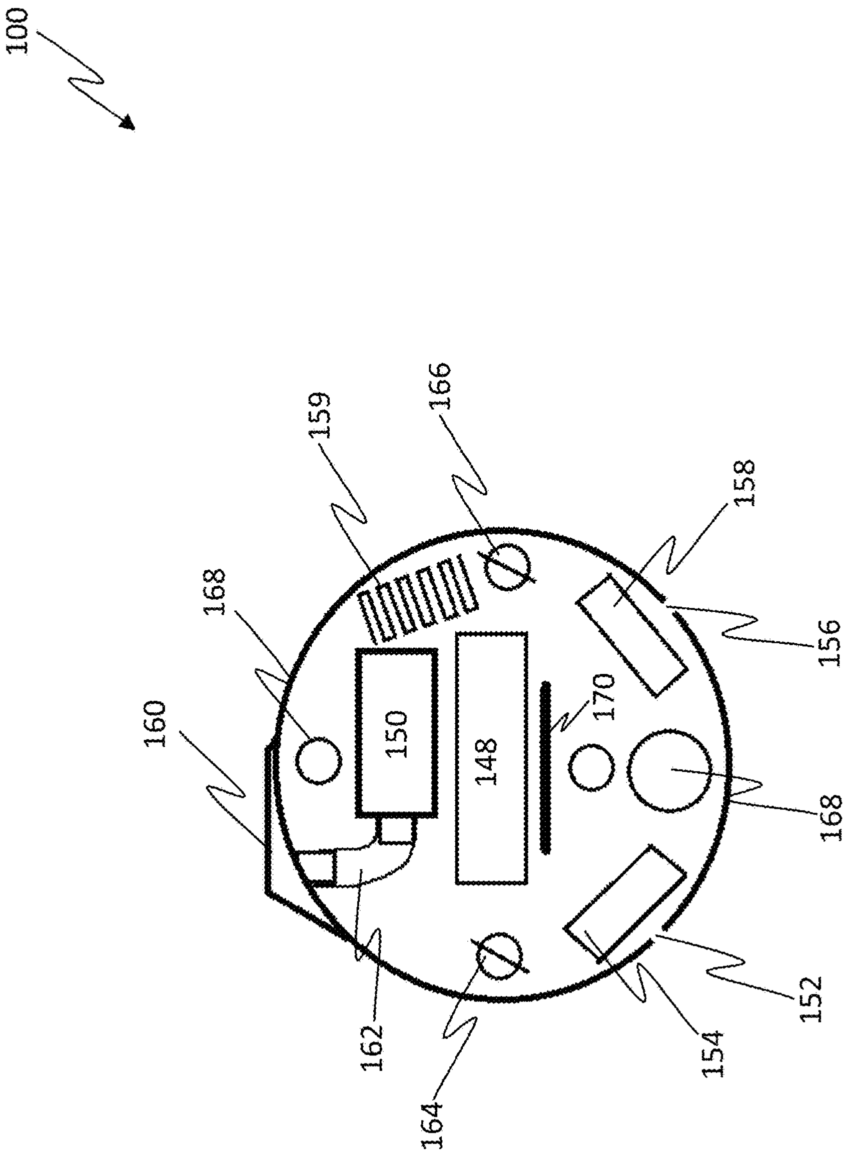
FIG. 2B is a sectional view of the receiving module of the PSAD of FIG. 1, showing electronic elements of the PSAD.
Figure 3A:
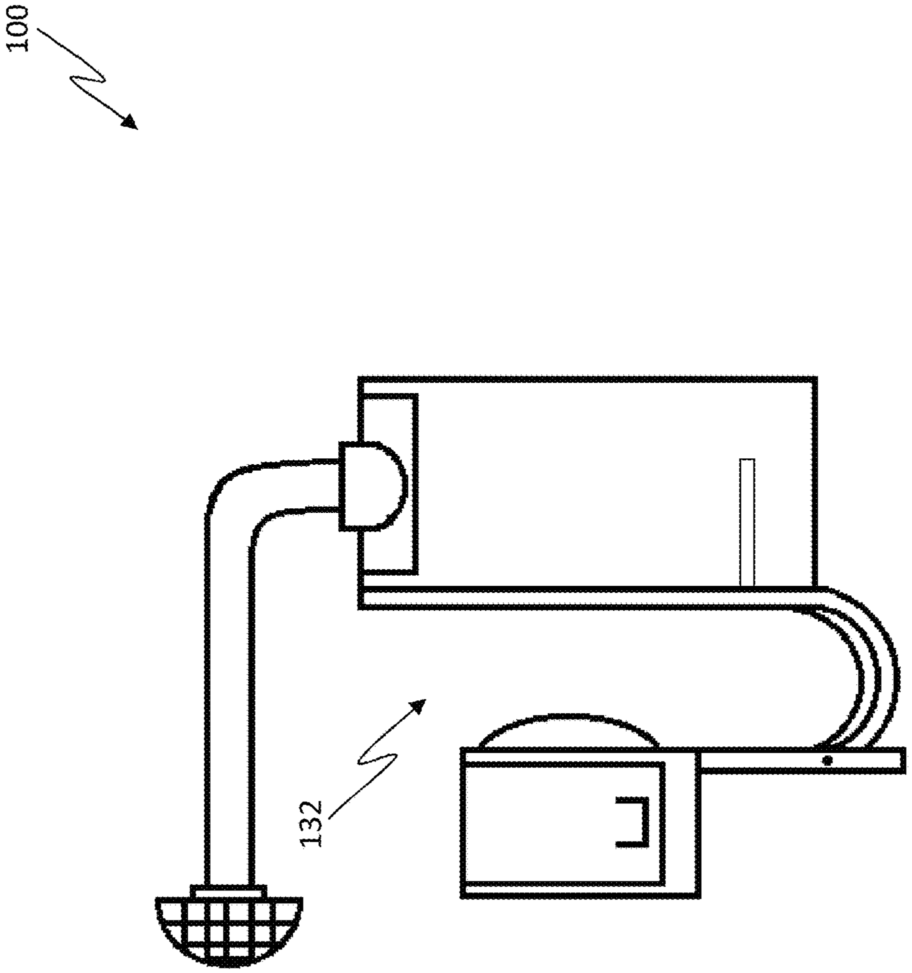
FIG. 3A is a side view of the PSDA of FIG. 1 configured in the closed configuration, in accordance with one embodiment of the invention.
Figure 3B:
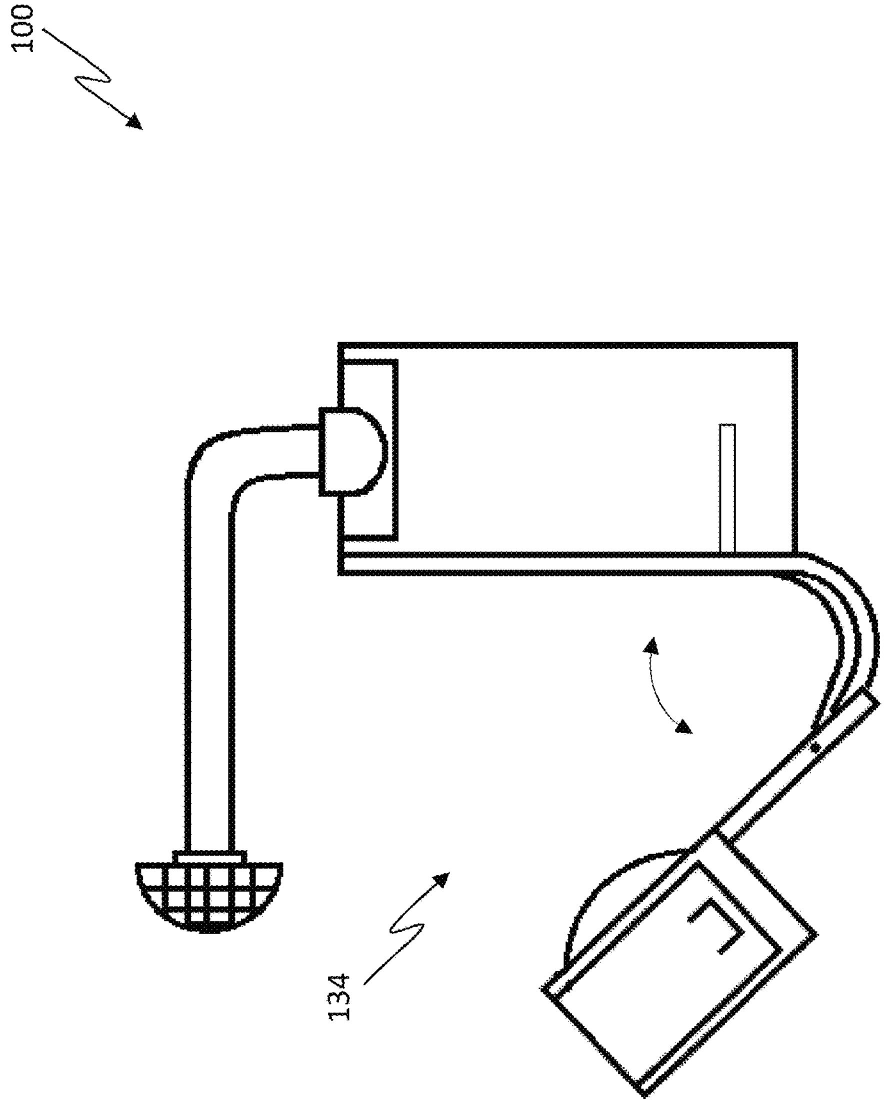
FIG. 3B is a side view of the PSDA of FIG. 1 configured in the open configuration, in accordance with one embodiment of the invention.
Figure 3C:
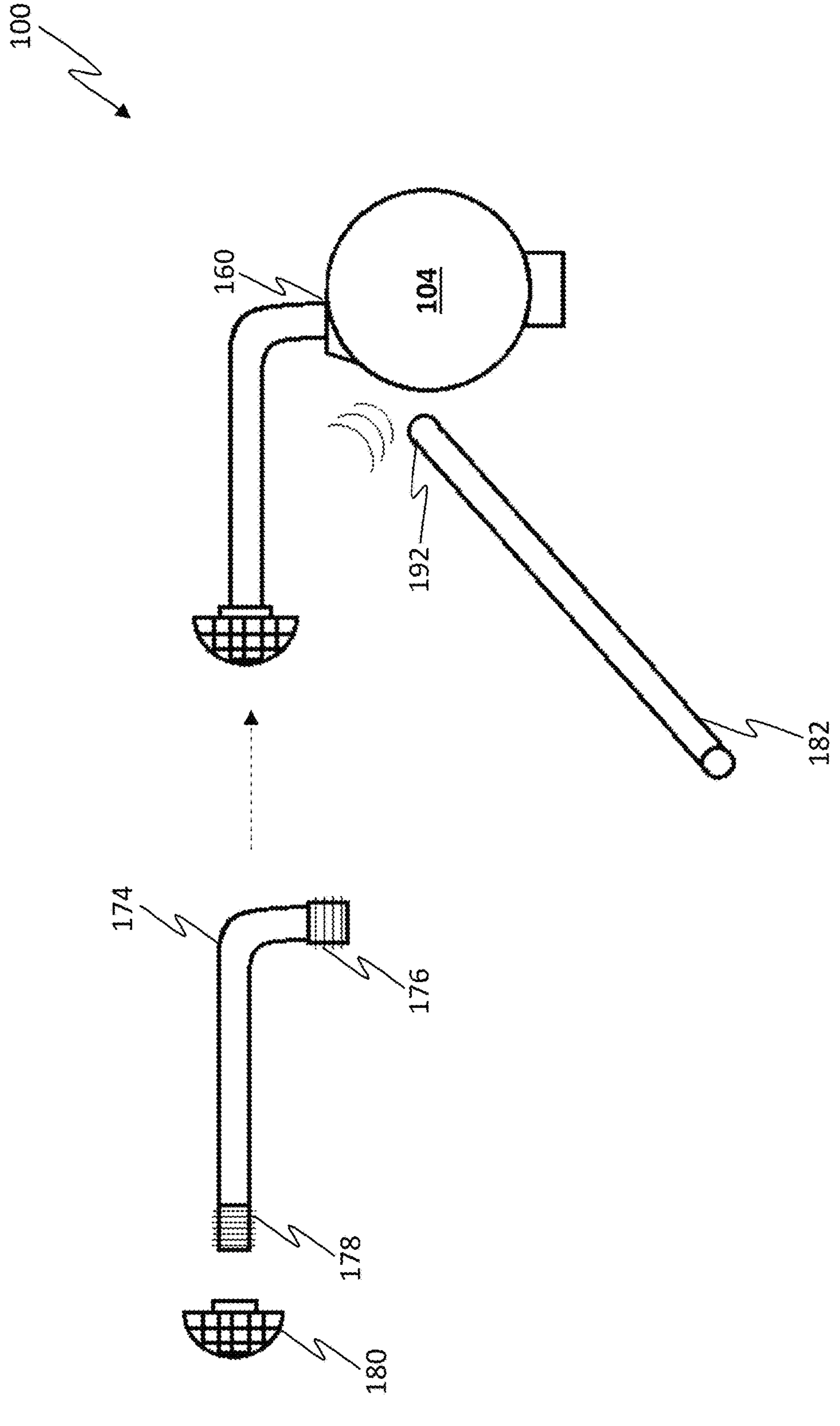
FIG. 3C is a front view of the PSDA of FIG. 1 associated with a preference wand, in accordance with one embodiment of the invention.
Figure 4:
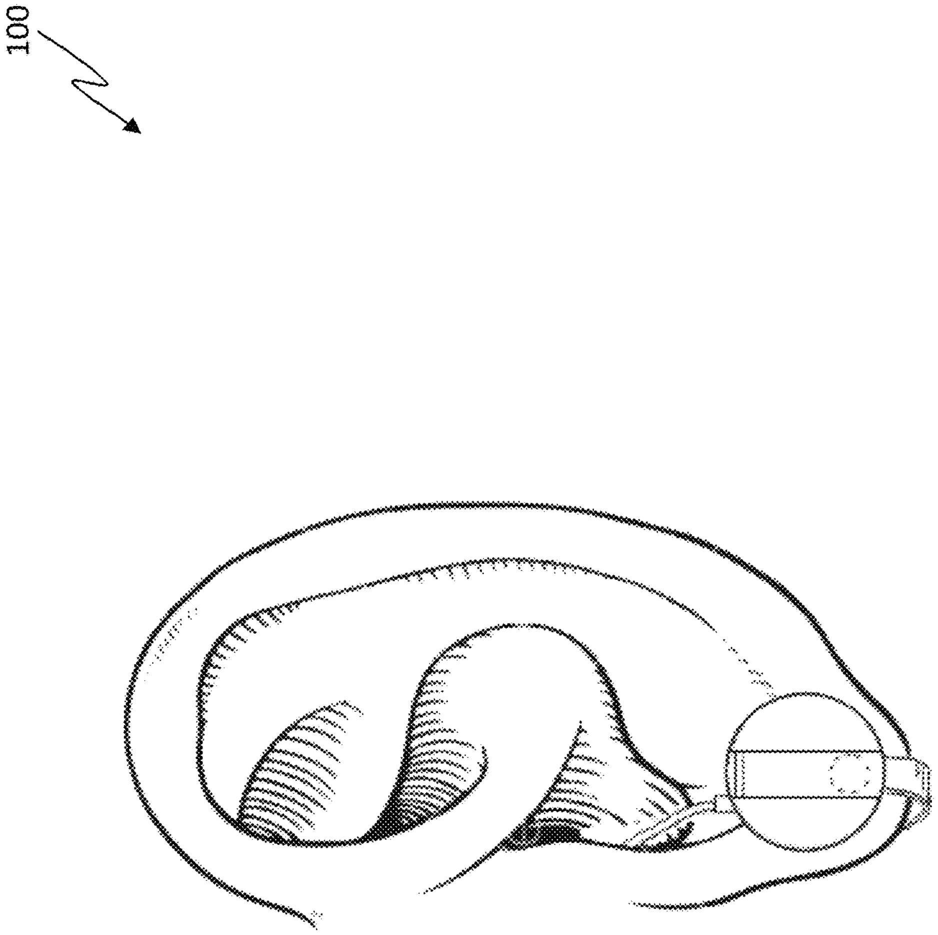
FIG. 4 is a view of the PSAD of FIG. 1 associated with the ear lobe of a user without a jewelry cover, in accordance with one embodiment of the invention.

In accordance with the present invention, a Personal Sound Amplification System (PSAS) is provided and includes one or more Personal Sound Amplification Devices (PSAD) that are configured to be worn as earring jewelry on the ear of a person. The PSAD is configured to receive sound, process the received sound and deliver the received sound through an external sound tube (or other delivery method) that traverses through the intertragal notch of a wearer's ear and into the wearer's ear canal. It is contemplated that embodiments of the PSAD also may incorporate a unique and novel adjustment system which utilizes a preference wand that wirelessly interacts with the PSAD to adjust various features, such as the tone and/or volume of the sound. In one embodiment, the PSAD may include a fully digital processor with advanced noise reduction and may provide the wearer with the ability to set the sound characteristics to their personal preference with either the preference wand, a user control button, and/or via a smart phone app. Additionally, the unique and novel design of the PSAD also allows the user to incorporate a decorative jewelry cover which may be attached to the PSAD via a variety of ways, such as via a magnetic clip.

These decorative covers may be used to help disguise the PSAD, wherein the covers may be able to be produced in unlimited designs that can help inspire the wearer to use them without the stigma of traditional hearing aid devices. Furthermore, it is contemplated that in some embodiments, the decorative covers may be used to receive and channel sound waves to microphones in the PSAD thereby allowing the decorative covers to be useful as directional receivers. Moreover, the PSAD may be worn on a part time or as needed basis, for example, restaurants, business meetings, theater, social events, etc. It is further contemplated that the PSAS may include one or more PSADs depending upon the needs of the wearer, wherein each of the PSADs may be separately programmable. For example, for a person that has hearing loss in only one ear, then only one PSAD may be required for the deficient ear, while a 'dummy' earring may be used for the normal hearing ear. While for a person that has hearing loss in both ears, two PSADs may be required, one for each ear. It is contemplated that each of the PSADs may be adjustable as a pair and/or they may be independently adjustable to allow people that have greater hearing loss in one ear to adjust each PSAD as required.

Referring to FIG. 1, FIG. 2A, FIG. 2B, FIG. 3A, FIG. 3B, FIG. 3C and FIG. 4, a Personal Sound Amplification Device (PSAD) 100 is shown in accordance with one embodiment and includes a receiving module 102 and a power module 104, wherein the power module 104 is movably connected to the receiving module 102 via a connecting member 106. The connecting member 106 includes a first member end 108 and a second member end 110, wherein the second member end 110 defines a connecting member cavity 112 which traverses the width of the second member end 110. The connecting member may be "J" shaped (or similarly shaped) such that the receiving module 102 and power module 104 define an article cavity 114 located between the receiving module 102 and the power module 104. When worn by a user, this "J" shaped connecting member 106 bends around the bottom of the wearer's earlobe thereby allowing the receiving module 102 to be located on the front portion of the wearer's earlobe and the power module 104 to be located on the rear portion of the wearer's earlobe, with the earlobe being disposed within the article cavity 114.

The power module 104 may include a power module body 116 which defines a power module body cavity 118 that is configured to contain a power supply/battery 120 and a power connector 122 which is associated with the power supply/battery 120. Additionally, the power module 104 further defines a connector cavity 124 and a pin cavity 126, wherein the connector cavity 124 is sized and shaped to contain the second member end 110 of the connecting member 106. Accordingly, a spring device 128 is located within the connector cavity 124 along with the second member end 110, wherein the second member end 110 compresses the spring device 128, such that the pin cavity 126 is aligned with the connecting member cavity 112. A mounting pin 130 is then located within the pin cavity 126 and the connecting member cavity 112. This configuration allows the connecting member 106 to rotate about an axis X that parallel to and extends through the mounting pin 130 and the pin cavity 126. Thus, the power module body 116 is movably connected to the connecting member 106 via the spring device 128, wherein the power module body 116 is resiliently rotatable about axis X between a first or closed configuration 132 and a second or open configuration 134, relative to the connecting member 106.

Accordingly, when the power module body 116 is disposed in the first configuration 132, the power module body 116 is located proximate the receiving module 102 and when the power module body 116 is disposed in the second configuration 134, the power module body 116 is located away from the receiving module 102. It should be appreciated that power module body 116 also may also include a body protrusion 136 which may be located on the power module body 116 to project into the article cavity 114. When the PSAD 100 is associated with a user, the body protrusion 136 advantageously compresses against the earlobe of a user to frictionally and/or compressingly interact with the user's earlobe to secure the PSAD 100 to the user's earlobe. It is contemplated that in other embodiments, the body protrusion 136 may be located on the connecting member 106 or on both the power module body 116 and the connecting member 106, as desired.

The receiving module 102 includes a receiving module body 137 having a module front 138, a module rear 140, a module top 142 and a module bottom 144. It should be appreciated that the receiving module body 137 defines a receiving module body cavity 146 for containing one or more of a processing device 148, an amplifier (which may be integrated with the processing device 148), a speaker 150, a first front microphone receiving port 152 communicated with a first front microphone 154, a second front microphone receiving port 156 communicated with a second front microphone 158, an antenna 159, a sound output nozzle 160 associate with the speaker 150 via an internal sound tube 162, an on/off switch (not shown), a magnetic switch 164 for programming the tone of the PSAD 100, a magnetic switch 166 for programming the volume of the PSAD 100, one or more attaching magnets 168 for magnetically interacting with a decorative jewelry cover 184, and a power input connector 170. It should be appreciated that the power input connector 170 of the receiving module 102 is connected to the power connector 122 of the power module 104 via a flexible power cable 172. It should be appreciated that the flexible power cable 172 advantageously electrically connects the electronic components of the receiving module 102 with the power supply/battery 120.

It should be appreciated that the PSAD 100 further includes an external sound tube 174, wherein the external sound tube 174 includes a module interface end 176 and a tube emission end 178 having a sound diffuser 180. The tube interface end 176 is configured to securely connect with the sound output nozzle 160 such that sound emanating from the sound output nozzle 160 enters the tube interface end 176 of the external sound tube 174, travels through the external sound tube 174, out of the tube emission end 178 and out of the sound diffuser 180. It should be appreciated that, as discussed herein, the receiving module body 137 may be configured to associate with a jewelry cover via either a clip, a magnet and/or a post to decoratively disguise the receiving module body 137.

The PSAD 100 further includes a preference wand 182 which may be configured to magnetically interact with the PSAD 100 to engage at least one of an on/off switch (not shown), a magnetic switch 164 for adjusting the tone of the PSAD 100 and the magnetic switch 166 for adjusting the volume of the PSAD 100. The PSAD 100 may be implemented by associating the PSAD 100 with the ear lobe of a user by locating the ear lobe within the article cavity 114 and by attaching the PSAD to the ear lobe in a similar fashion as a user would put on an earring that is meant for non-pierced ears. (i.e. compression). The external sound tube 174 is then configured so that the external sound tube 174 is located within the intertragal notch of a wearer's ear such that the sound diffuser 180 is located within the ear canal of the wearer.

Figure 5A:
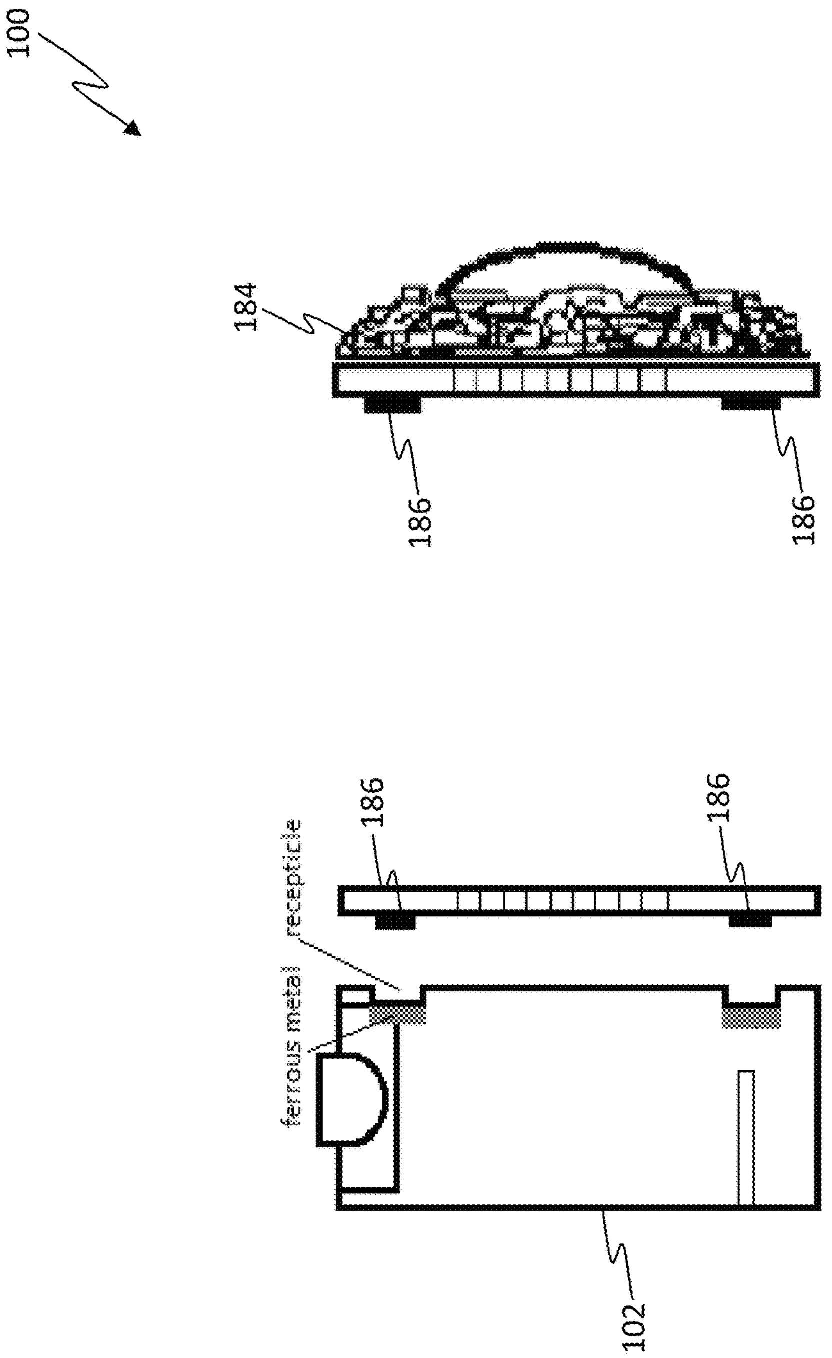
FIG. 5A is a side view of the receiving module of the PSAD of FIG. 1 associating with a jewelry cover, in accordance with one embodiment of the invention.
Figure 5B:
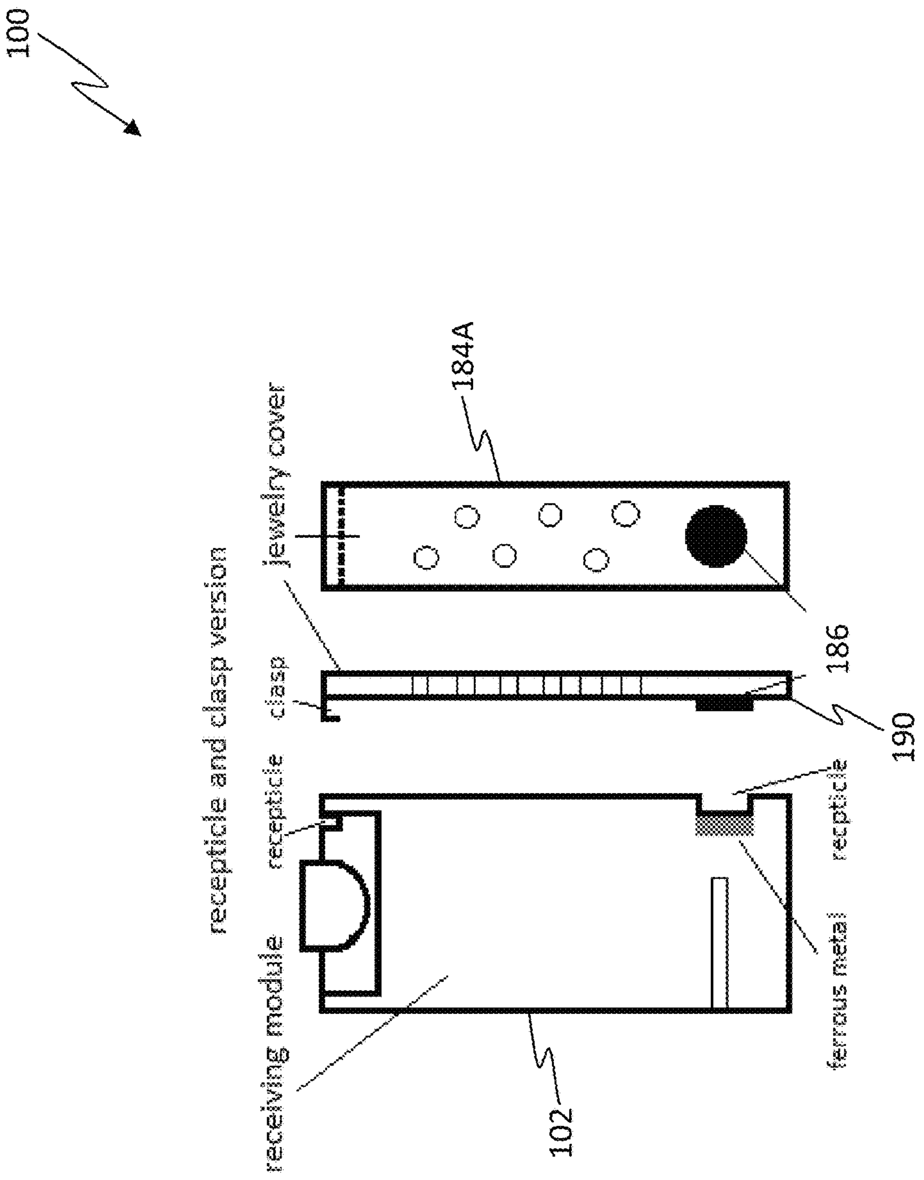
FIG. 5B is a side view of the receiving module of the PSAD of FIG. 1 associating with a jewelry cover, in accordance with another embodiment of the invention.
Figure 5C:
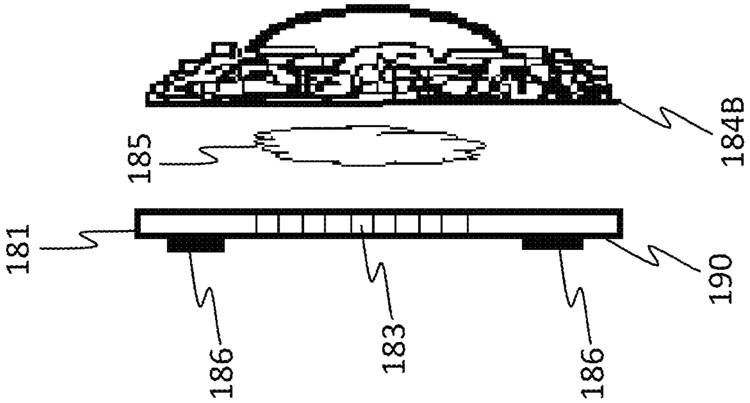
FIG. 5C is a side view of a jewelry cover configured to associate with the receiving module of the PSAD of FIG. 1, in accordance with still yet another embodiment of the invention.
Figure 5D:
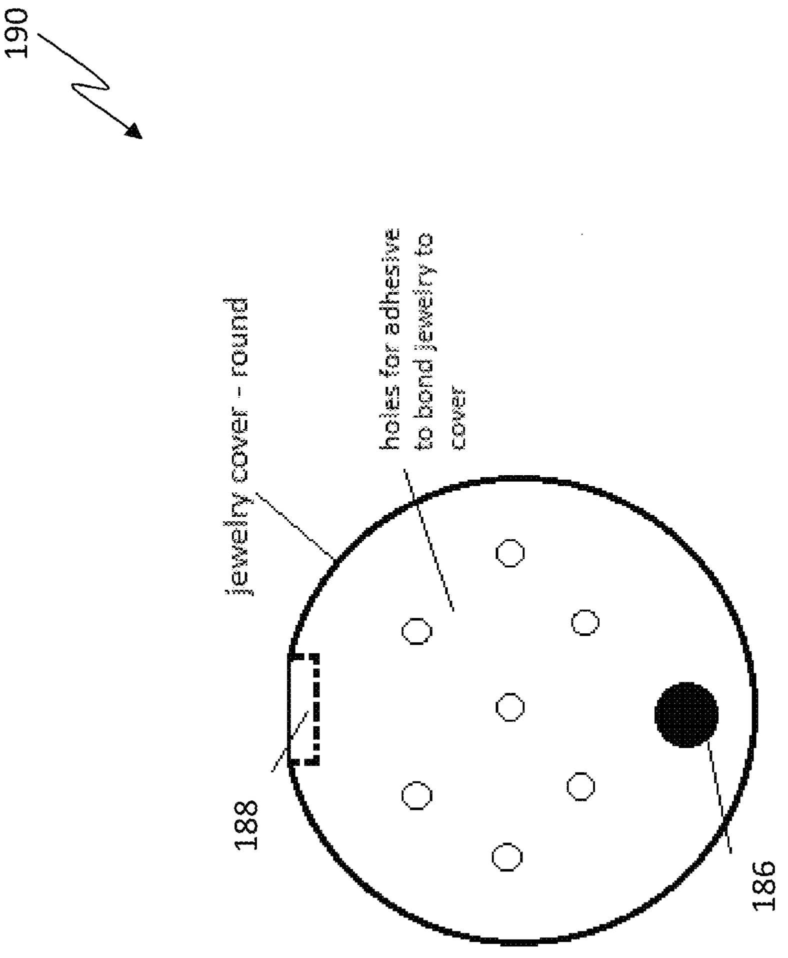
FIG. 5D is a front view of a mounting plate for use with a jewelry cover configured to associate with the receiving module of the PSAD of FIG. 1, in accordance with still yet another embodiment of the invention.

As discussed briefly hereinbefore, it should be appreciated that the PSAD 100 may be configured to associate with a decorative jewelry cover 184 which attaches to the receiving module body 137 to cover the module front 138. It should be appreciated that the decorative jewelry cover 184 may be removably associated with the receiving module body 137 via any device and/or method suitable to the desired end purpose. For example, in one embodiment the decorative jewelry cover 184 may include one or more magnets 186 which are located to magnetically engage with attaching magnets 168 (See FIG. 5A). While in another embodiment the decorative jewelry cover 184A may include a mounting plate 190 having a magnet 186 and an attaching clasp 188, wherein the magnet 186 magnetically engages with an attaching magnet 168 and the attaching clasp 188 engages with the receiving module body 137. The decorative jewelry cover 184A may then securely associate with the mounting plate 190 via a magnet 186 (See FIG. 5B). While in still yet another embodiment, the decorative jewelry cover 184B may include the mounting plate 190 which includes one or more magnets 186 that are located to magnetically engage with attaching magnets 168 to secure the mounting plate 190 to the receiving module body 137. The decorative jewelry cover 184 may then be secured to the mounting plate 190 via an adhesive (See FIG. 5C and FIG. 5D). It is contemplated that the PSAD 100 may be configured to turn on when the decorative jewelry cover 184 is associated with the receiving module body 137. This may be accomplished via any device and/or method suitable to the desired end purpose, such as a magnetic switch that senses when the decorative jewelry cover 184 magnetically engages with the attaching magnet(s) 168 and turns on the PSAD 100. It should be appreciated the decorative jewelry cover 184 may include a cover base 181 having one or more openings 183 to allow the jewelry cover 184 to be bonded to the cover base 185 via an adhesive 185.

Referring again to FIGS. 1-4, it should be appreciated that in one embodiment, the PSAD 100 is a two part housing design, wherein the front part houses the electronics (i.e. processing device 148, amplifier, speaker 150, two microphones 154, 158, antenna 159, sound output nozzle 160, magnetic on/off switch, magnet for jewelry clasp, user switches) and the rear part houses the power supply and the electrical connector connecting the power supply to the electronics. It is contemplated that the two microphones may be located on the underside of the front section to reduce incidence of failure and wind noise, while allowing maximum directionality to improve the ability to hear in noisy environments. The sound output nozzle 160 which may be directed out of and upwardly from the module top 142 may be offset to allow the external sound tube 174 to rest in the intertragal notch of a wearer's ear thereby allowing it to fit most ears.

Figure 6A:
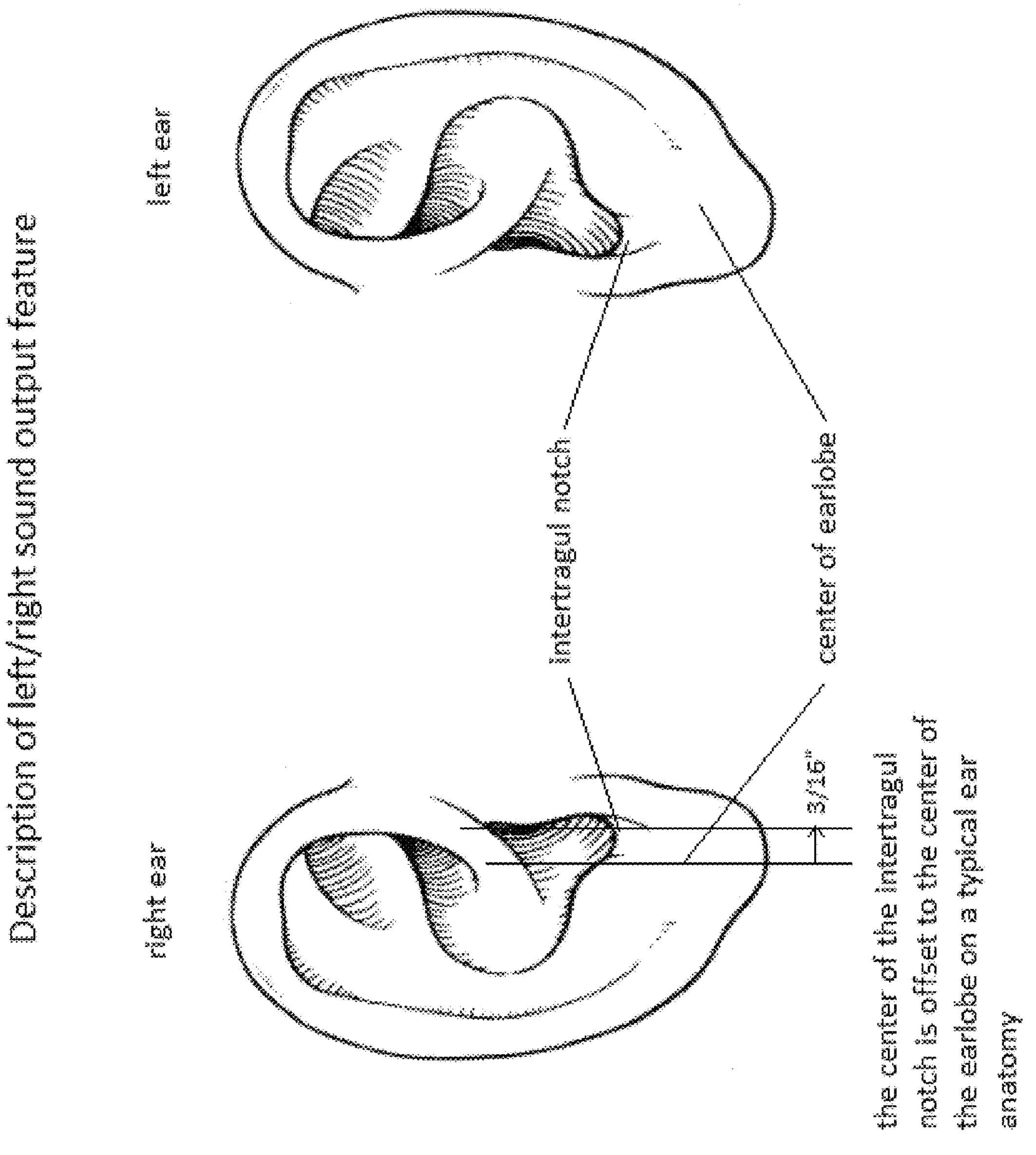
FIG. 6A is a front view of the left and right ears of a person.
Figure 6B:
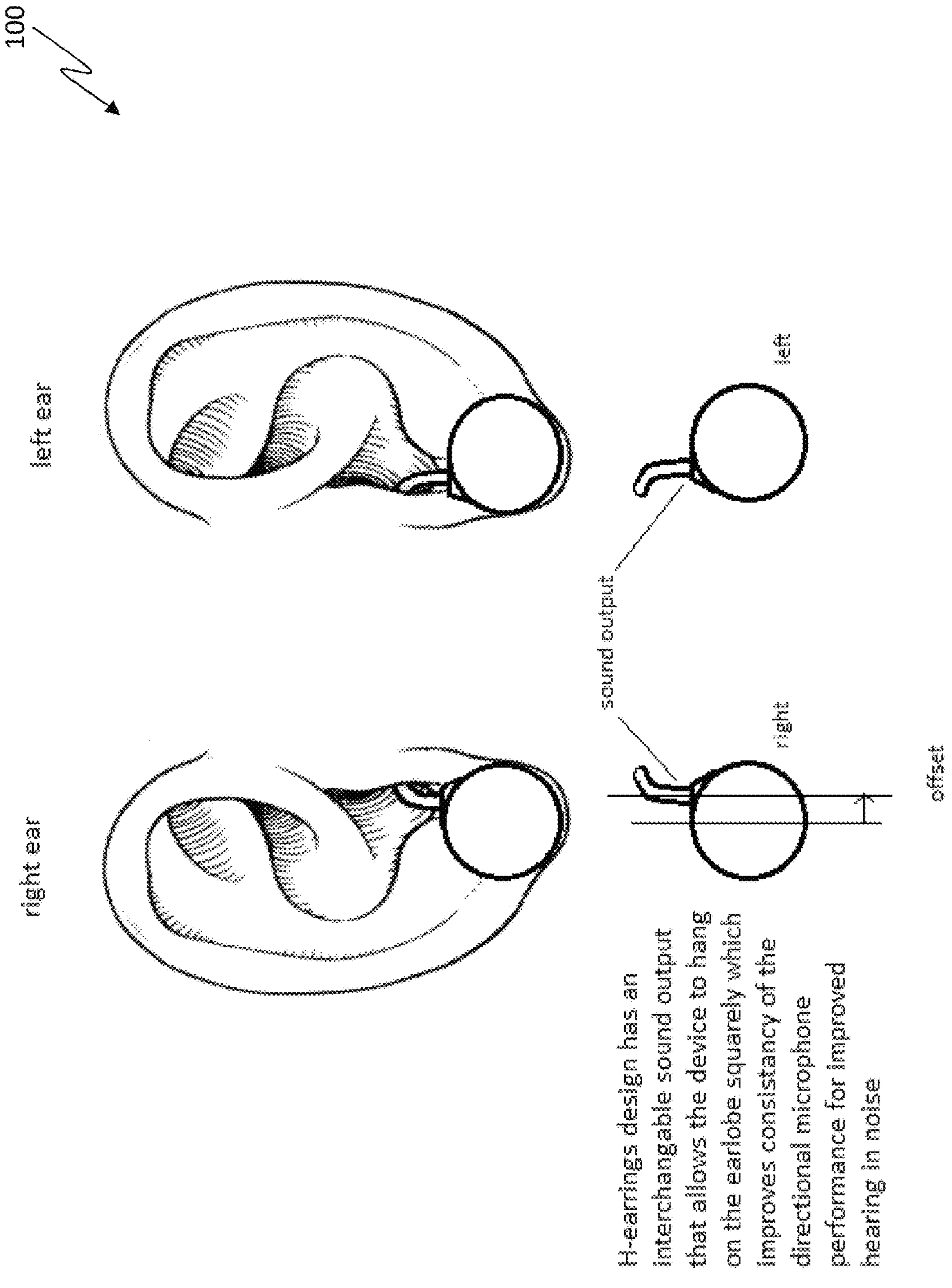
FIG. 6B is a front view of the PSAD of FIG. 1 associated with the left and right ear lobes of a person, in accordance with one embodiment of the invention.
Figure 7A:
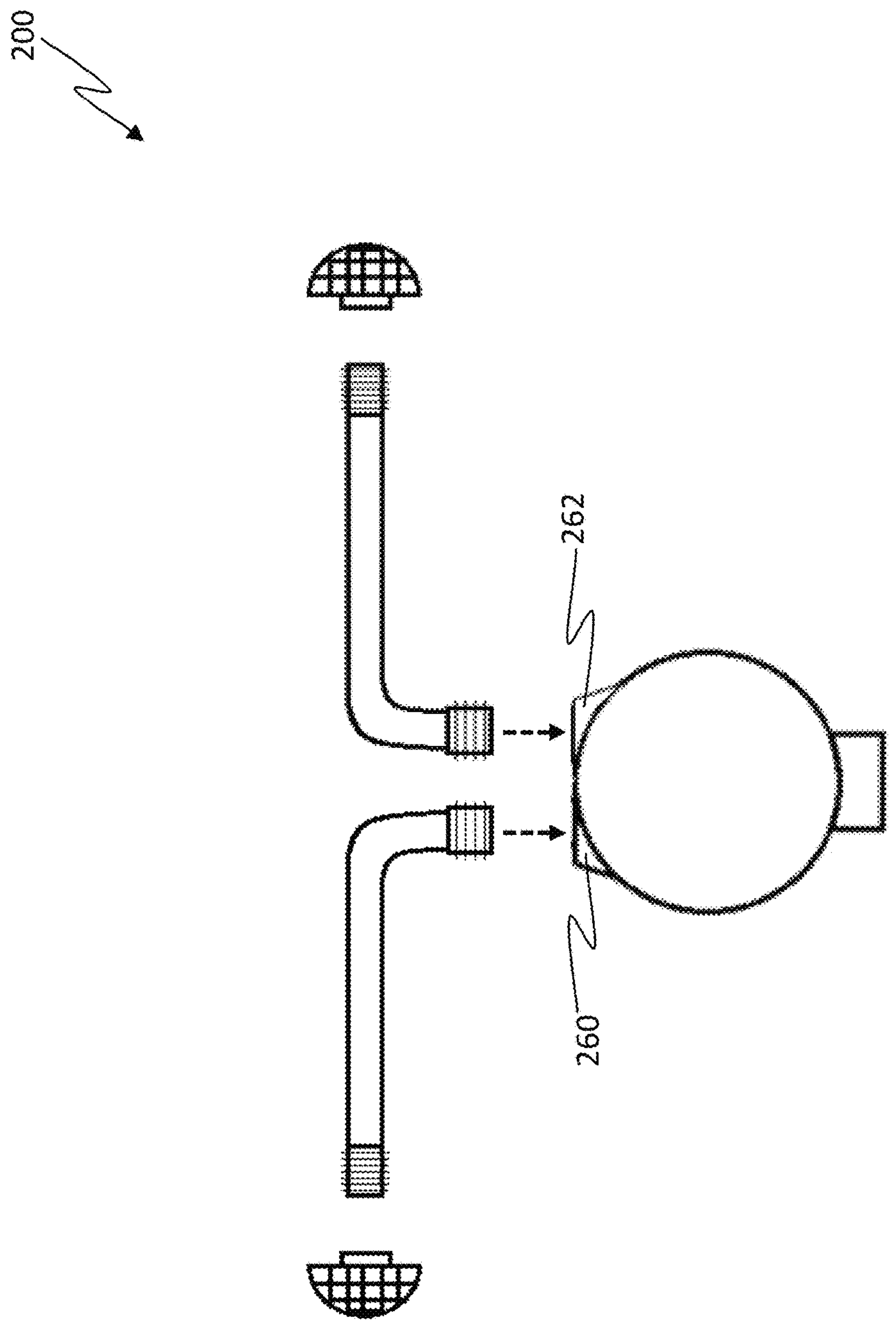
FIG. 7A is a front view of a PSAD having multiple sound output nozzles, in accordance with another embodiment of the invention.
Figure 7B:
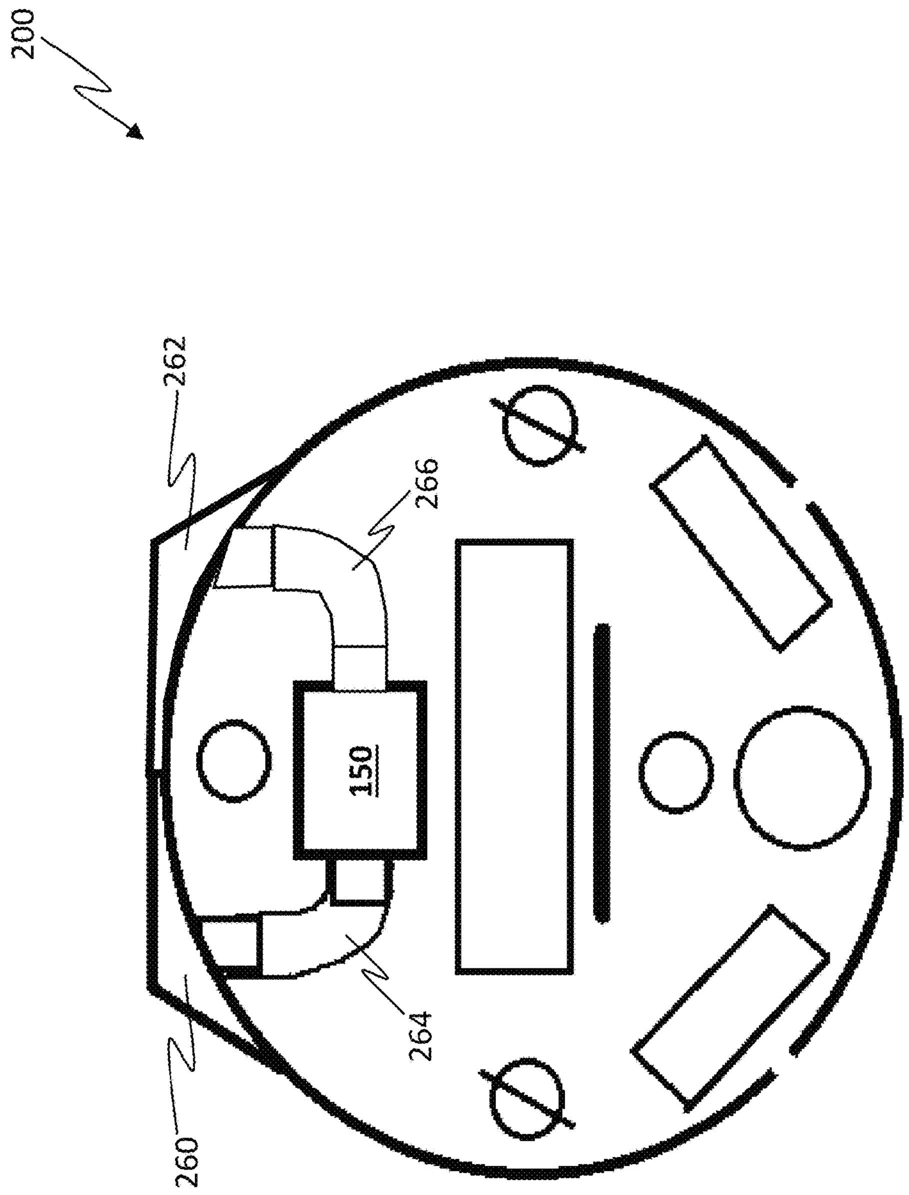
FIG. 7B is an internal view of the receiving module for the PSAD of FIG. 7A, in accordance with another embodiment of the invention.

It should be appreciated that the orientation of the ear structure on a person's left side is opposite the orientation of the ear structure on the person's right side. Thus, a device that is configured for the external sound tube 174 to be inserted into the intertragal notch of a left ear is not suitable for use in the right ear because the external sound tube 174 will be located too far from the intertragal notch. Referring to FIG. 6A and FIG. 6B, one way to address this issue is to make the PSAD 100 so that the PSAD 100 is configured for use in either the right ear or the left ear, as shown in one embodiment of the invention. Another way to address this issue is to include multiple sound output nozzles. Referring to FIG. 7A and FIG. 7B, a PSAD 200 having a first sound output nozzle 260 and a second sound output nozzle 262 is shown, in accordance with one embodiment of the invention, wherein the first sound output nozzle 260 is in audio communication with the speaker 150 via a first internal sound tube 264 and the second sound output nozzle 262 is in audio communication with the speaker 150 via a second internal sound tube 266. It should be appreciated that the PSAD 200 advantageously allows for the PSAD 200 to be used with either ear, as desired.

Figures 8A, 8B:
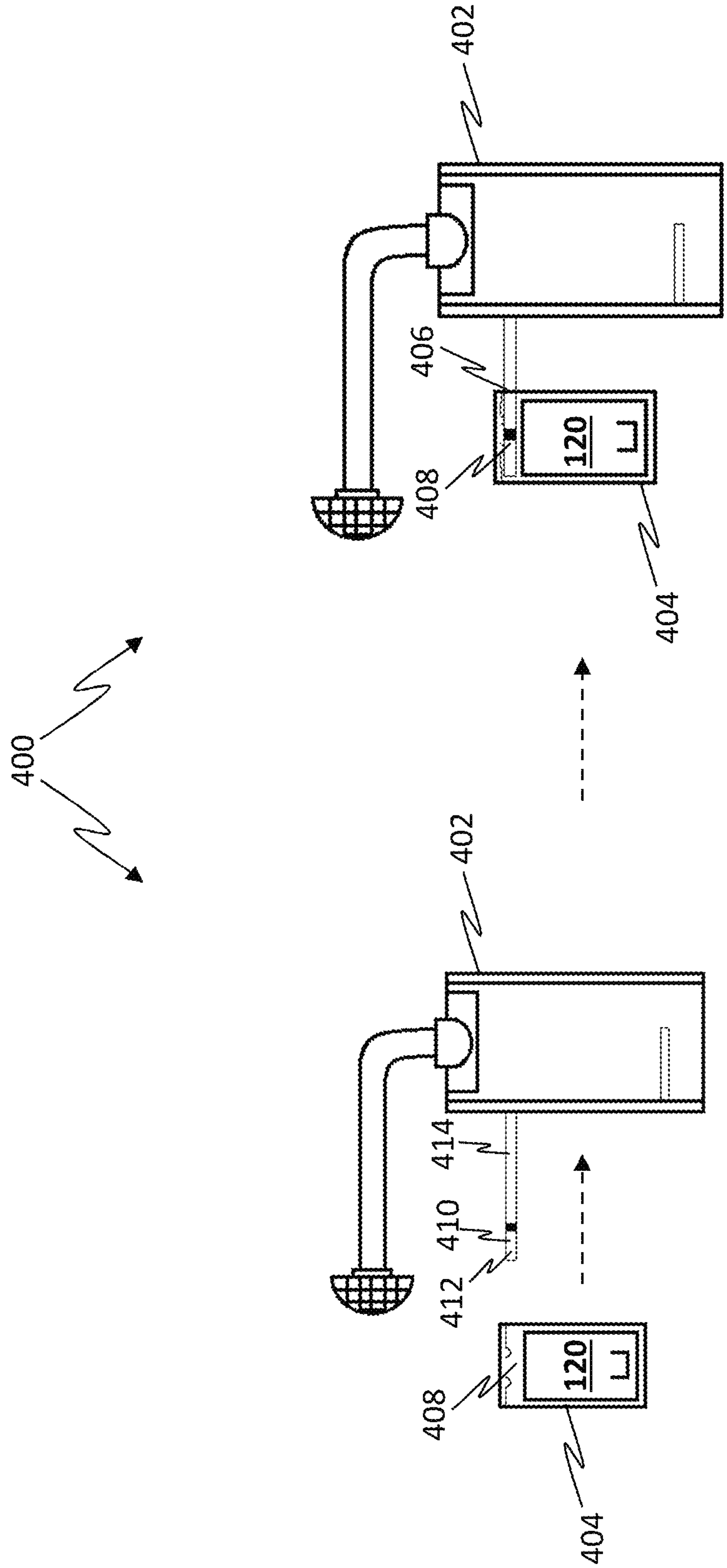
FIG. 8A is a side view of a PSAD configured for use with a user having pierced ears, in accordance with still yet another embodiment of the invention.
FIG. 8B is a side view of the PSAD of FIG. 8A.

Referring to FIG. 8A and FIG. 8B, a PSAD 400 configured for use by a wearer having pierced ears is shown, in accordance with another embodiment of the invention. The PSAD 400 includes a receiving module 402 and a power module 404, wherein the power module 404 includes a power opening 406 communicated with a power cavity 408 that is associated with the power source 120 contained therein. Additionally, the receiving module 402 includes a mounting post 410 which extends out of the module rear 440, wherein the mounting post 410 is configured to be in electrical connection with one or more of the electrical components located therein. The mounting post 410 may be configured as a dual pole contact stud having a mounting post first end 412 and a mounting post second end 414, wherein the mounting post first end 412 is configured as one polarity and the mounting post second end 414 is configured as the opposite polarity. Accordingly, if a potential difference exists between the mounting post first end 412 and the mounting post second end 414, then the electrical components within the PSAD 400 will be powered. It should be appreciated that the power cavity 408 is configured to removably and securely contain (mechanically and/or frictionally) the mounting post 410, when the mounting post 410 is contained therein. When the mounting post 410 is contained within the power cavity 408, the mounting post first end 412 is electrically associated with one polarity of the power source 120 and the mounting post second end 414 is electrically associated with the other polarity of the power source 120. Thus, when the mounting post 410 is contained within the power cavity 408, an electrical potential difference exists between the mounting post first end 412 and the mounting post second end 414. It should be appreciated that in this embodiment, the power module acts as a power source 120 and as an earring backing to secure the PSAD 400 to the ear of a wearer.

Figure 9:
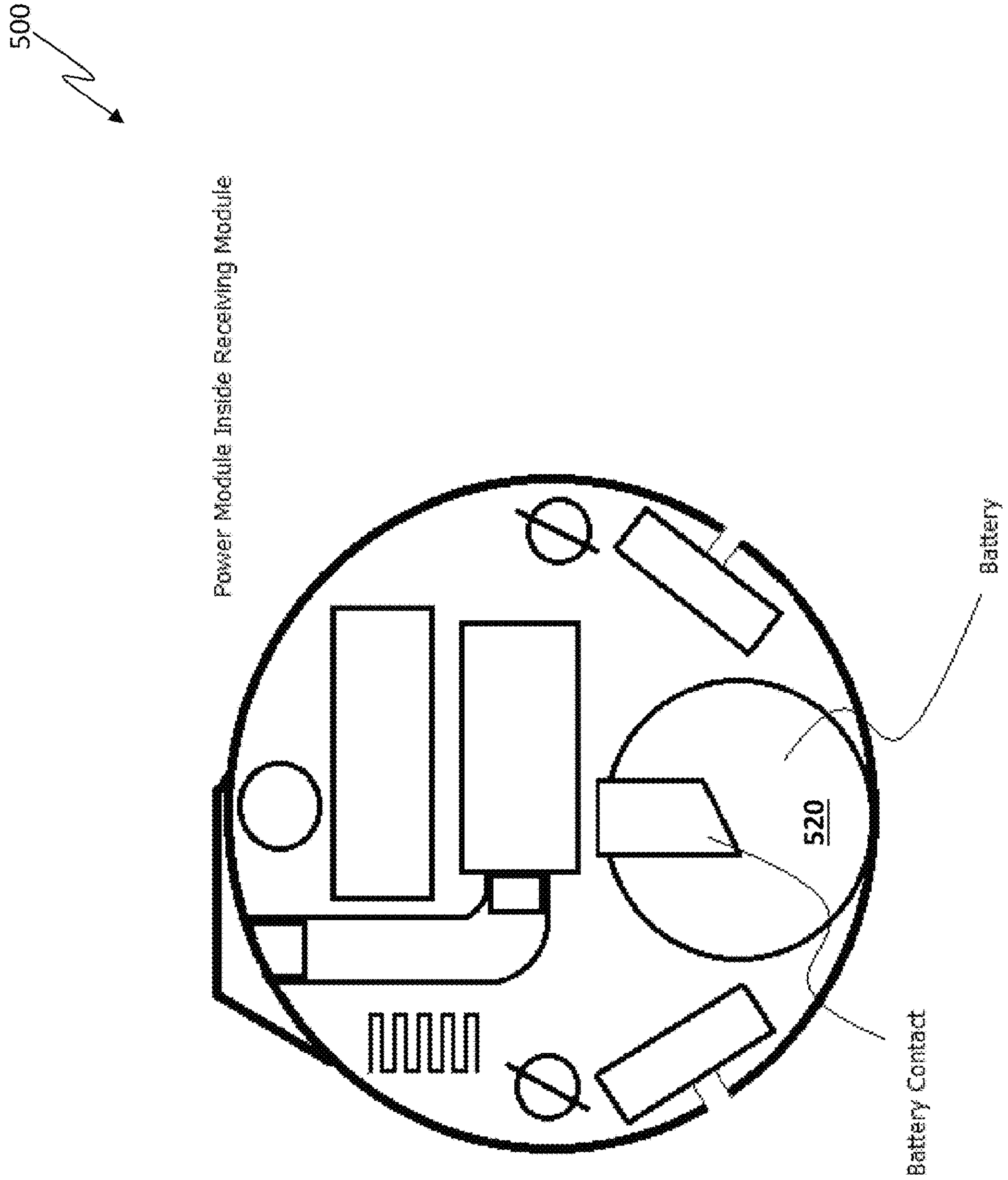
FIG. 9 is a internal view of the receiving module of a PSAD having an internal power source, in accordance with still yet another embodiment of the invention.
Figure 10:
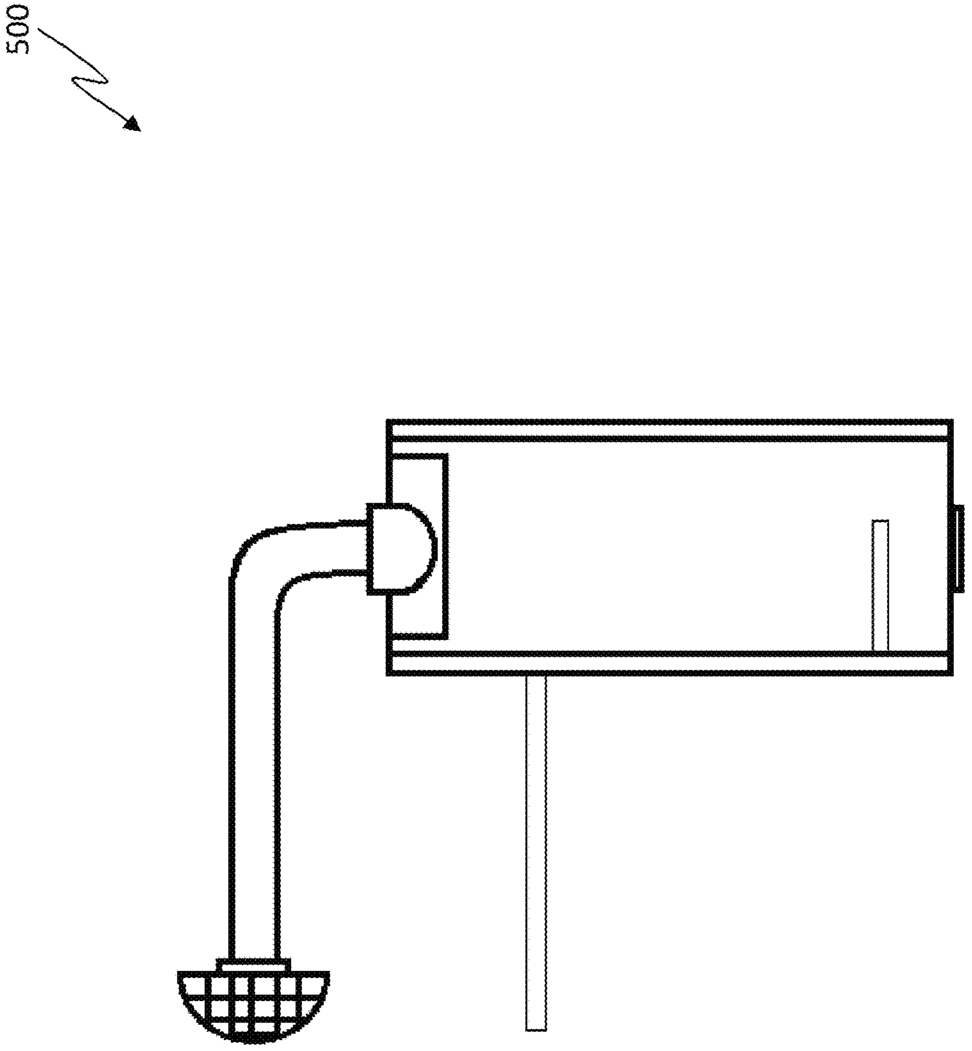
FIG. 10 is a side view of the PSAD of FIG. 9 configured for use with a user having pierced ears, in accordance with still yet another embodiment of the invention.
Figure 11:
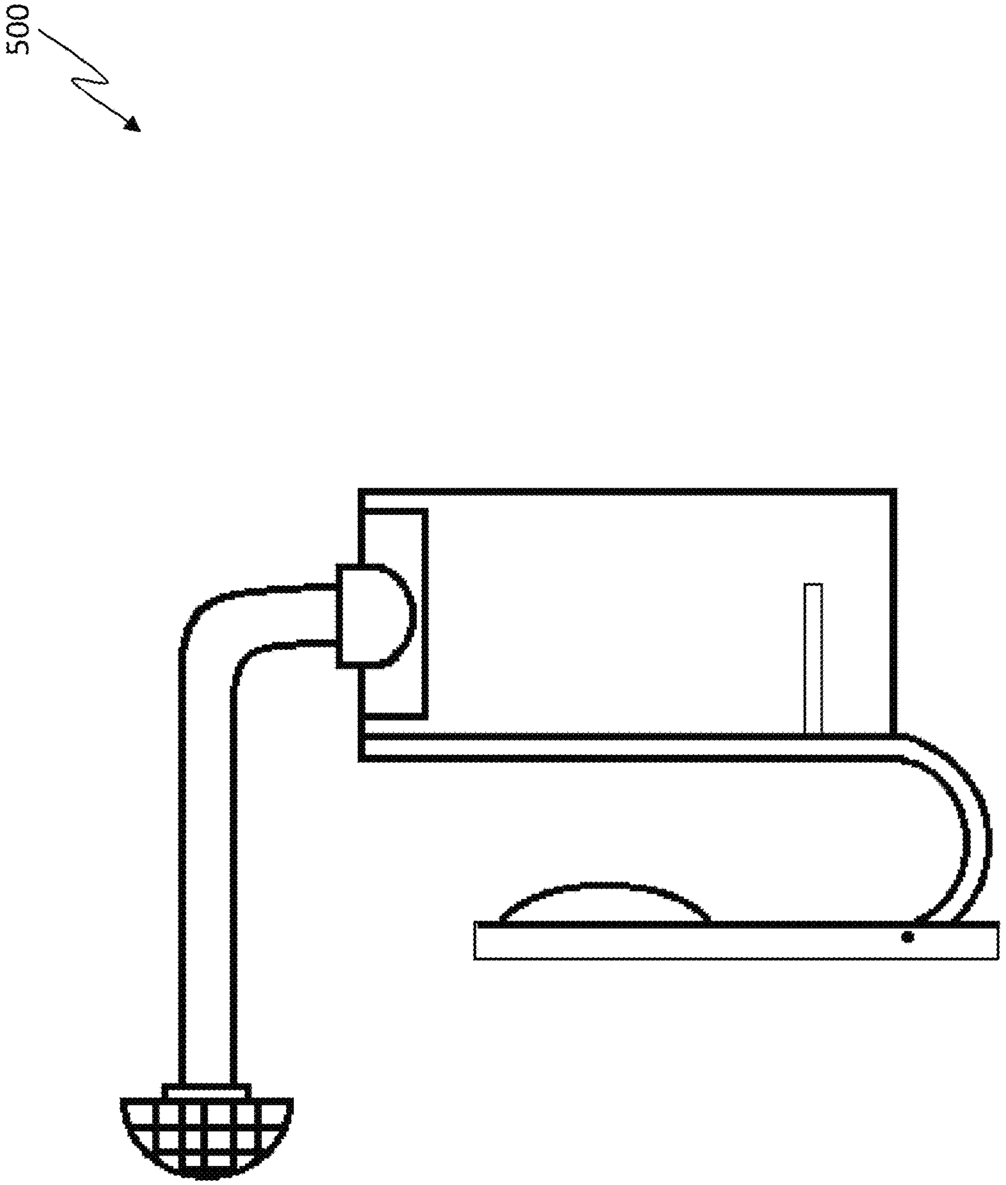
FIG. 11 is a side view of the PSAD of FIG. 9 configured for use with a user having non-pierced ears, in accordance with still yet another embodiment of the invention.
Figure 12:
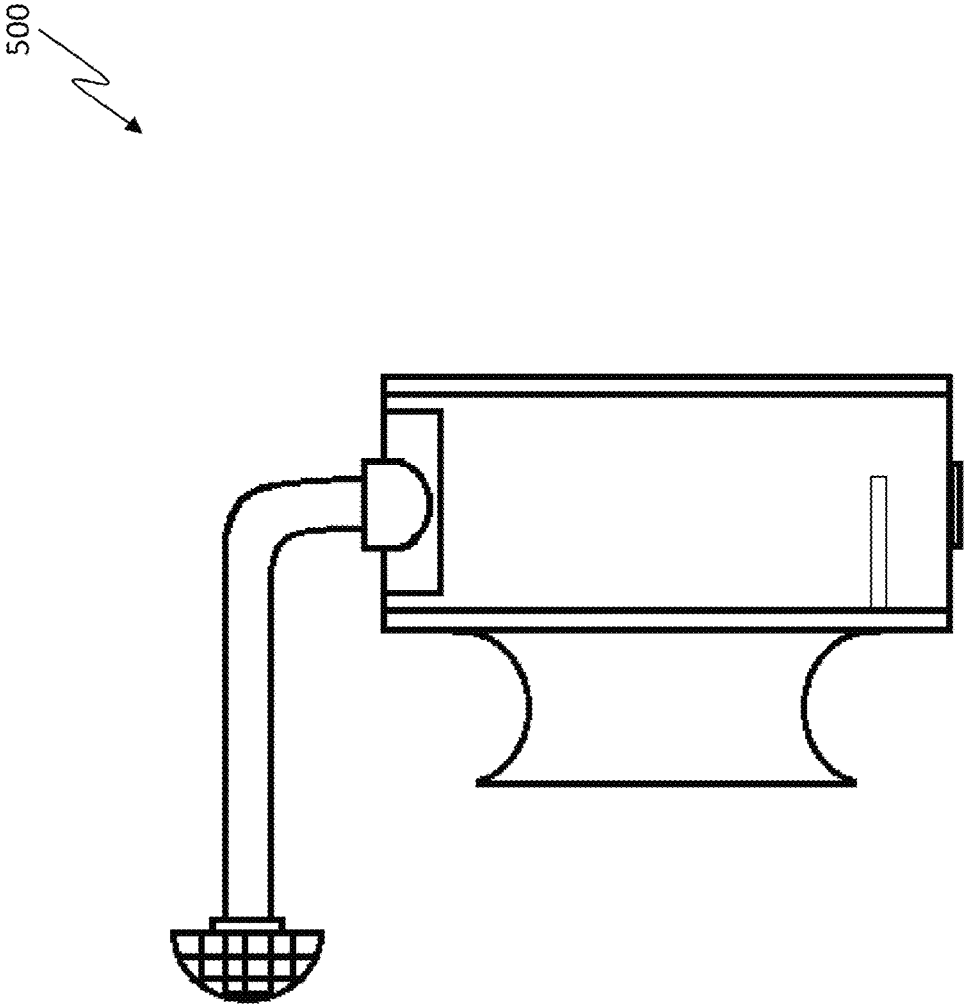
FIG. 12 is a side view of the PSAD of FIG. 9 configured for use with a user having pierced ears with larger ear holes, in accordance with still yet another embodiment of the invention.
Figure 13:
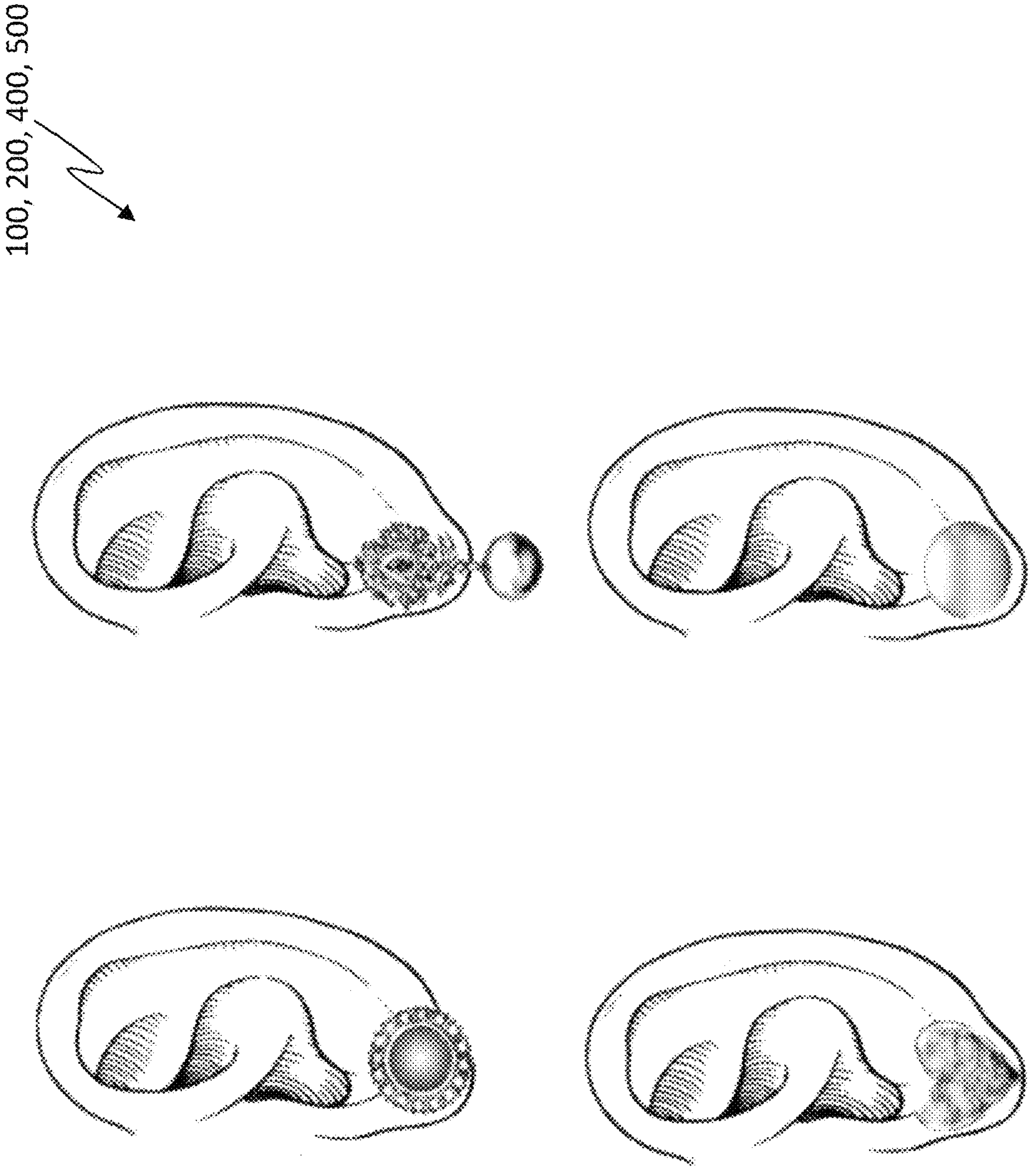
FIG. 13 is a view of the PSAD of FIG. 8A and FIG. 9 associated with a variety of ear lobes with various jewelry covers, in accordance with embodiments of the invention.

Referring to FIG. 9, a PSAD 500 that includes an internal power source 520 (i.e. battery) is shown, in accordance with still yet another embodiment of the invention. It should be appreciated that the PSAD 500 may be configured for use by wearers having pierced ears (See FIG. 10), non-pierced ears (See FIG. 11) and wearers with large gauge ear holes (See FIG. 12). Referring to FIG. 13, a variety of decorative jewelry covers are shown associated with PSAD 100, 200, 400, 500.

Figure 14A:
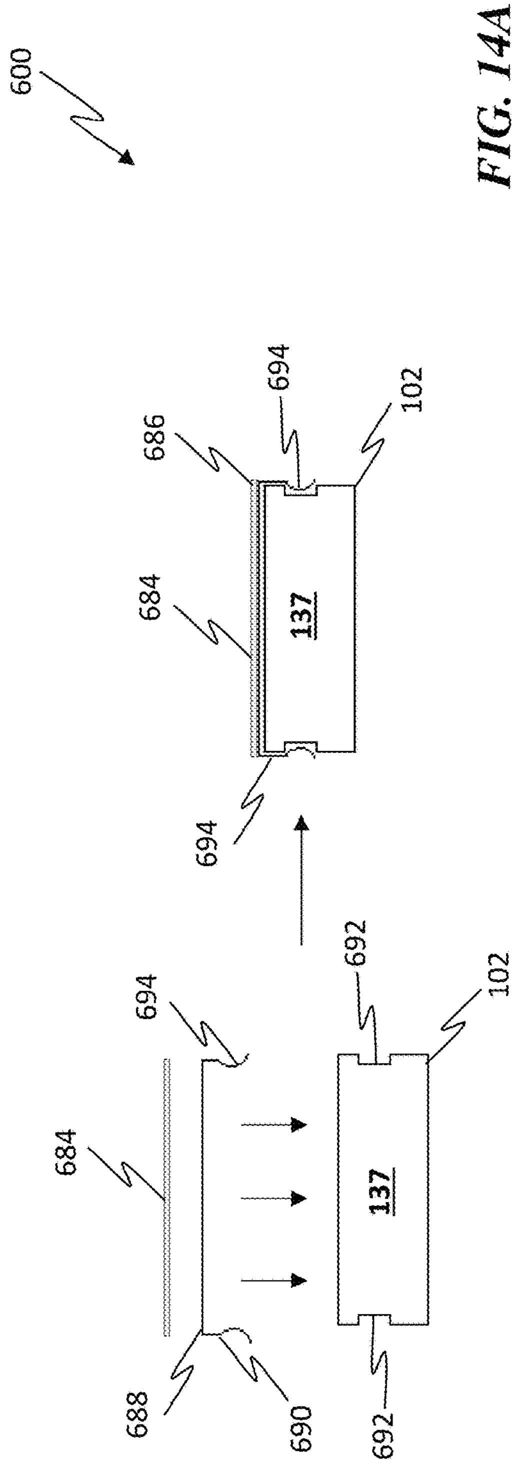
FIG. 14A is a side view of a jewelry cover associating with a receiving module of a PSAD, in accordance with another embodiment of the invention.
Figure 14B:
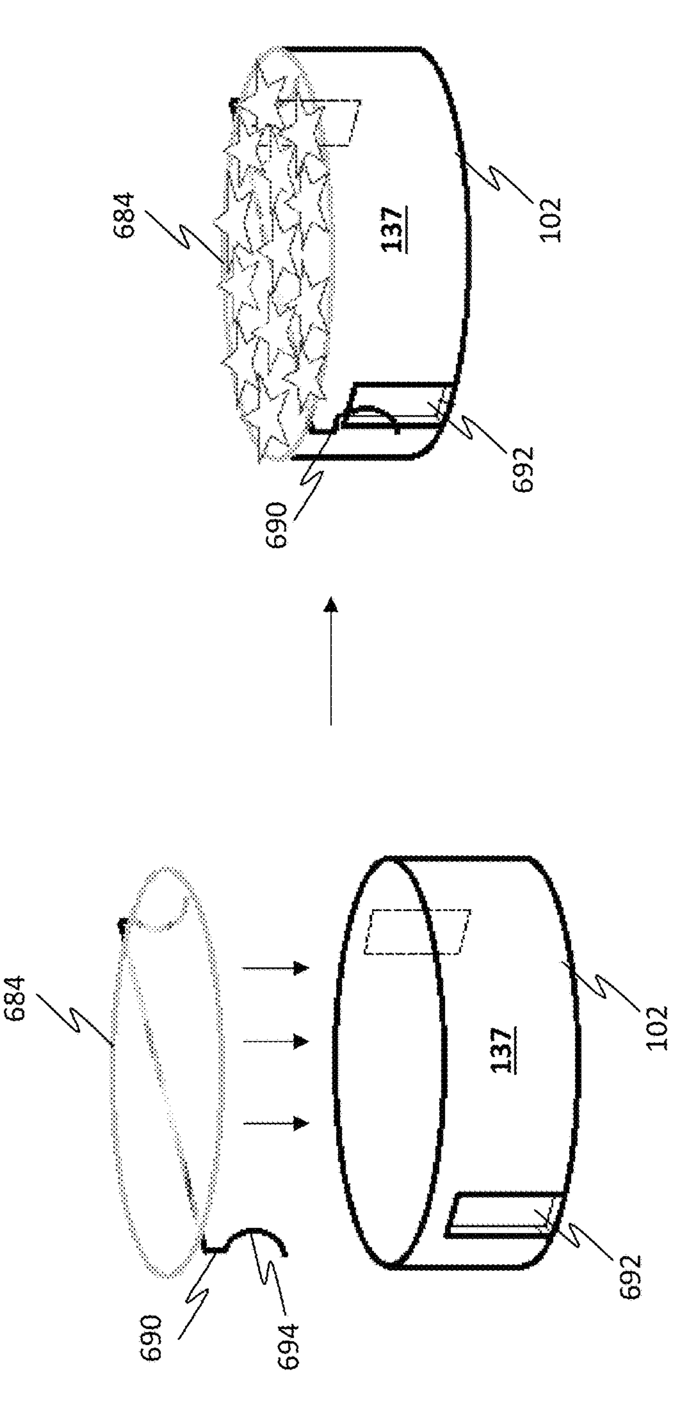
FIG. 14B is a side view of the jewelry cover of FIG. 14A illustrating a decorative jewelry cover associated with the receiving module of the PSAD of FIG. 14A.

Referring to FIG. 14A and FIG. 14B, another embodiment of the PSAD 600, showing still yet another way to connect a jewelry cover 684 to the receiving module 102 is illustrated. In this embodiment, the jewelry cover 684 includes a cover base 686 having a cover frame 688 and cover catches 690, wherein the cover catches 690 are resiliently connected to the cover frame 688 and extend perpendicular away from the cover frame 688. The receiving module 102 may include recessed portions 692 located on the side of the module body 137, wherein the recessed portions 692 are configured to receive and contain the cover catches 690. It should be appreciated that the cover catches 690 include a rounded portion 694 which seat within the recessed portions 692 when the cover base 686 is associated with the module body 137. It should be appreciated that the jewelry cover 684 is associated with the module body 137 by compressing the jewelry cover 684 onto the module body 137 such that the rounded portion 694 of the cover catches 690 contact the module body 137 and flex outwardly. When the rounded portions 694 of the cover catches 690 encounter the recessed portions 692, the rounded portions 694 become contained with the recessed portions 692 and return to their unflex configuration. It should be appreciated that the cover base 686 further includes a jewelry cover portion 684 which is connected to the cover frame 688.

As discussed hereinabove and referring again to the figures, in one embodiment, the decorative jewelry cover 184 may be connected to the module front 138 by means of a clip at the top of the module front 138 and an attaching magnet 168. It is contemplated that the PSAD 100, 200, 400, 500, 600 may be configured to turn on when the decorative jewelry cover 184 is associated with the receiving module 102, 402. Additionally, the preference wand 182 includes a magnetized end 192 may be included wherein with the preference wand 182 may be used to change the tone and volume level of the PSAD 100, 200, 400, 500, 600 by placing the magnetized end 192 of the preference wand 182 near the side of the receiving module 102, 402 so that the magnetized end 192 of the preference wand 182 interacts with the magnetic switch 164 and/or the magnetic switch 166. There may be an audible signal to indicate which tone and/or volume has been chosen. The setting may remain in effect until the next time the preference wand is used. It is contemplated that there may also be "dummy" units available for persons wearing only one amplifier device (monaural).

Figure 15A:
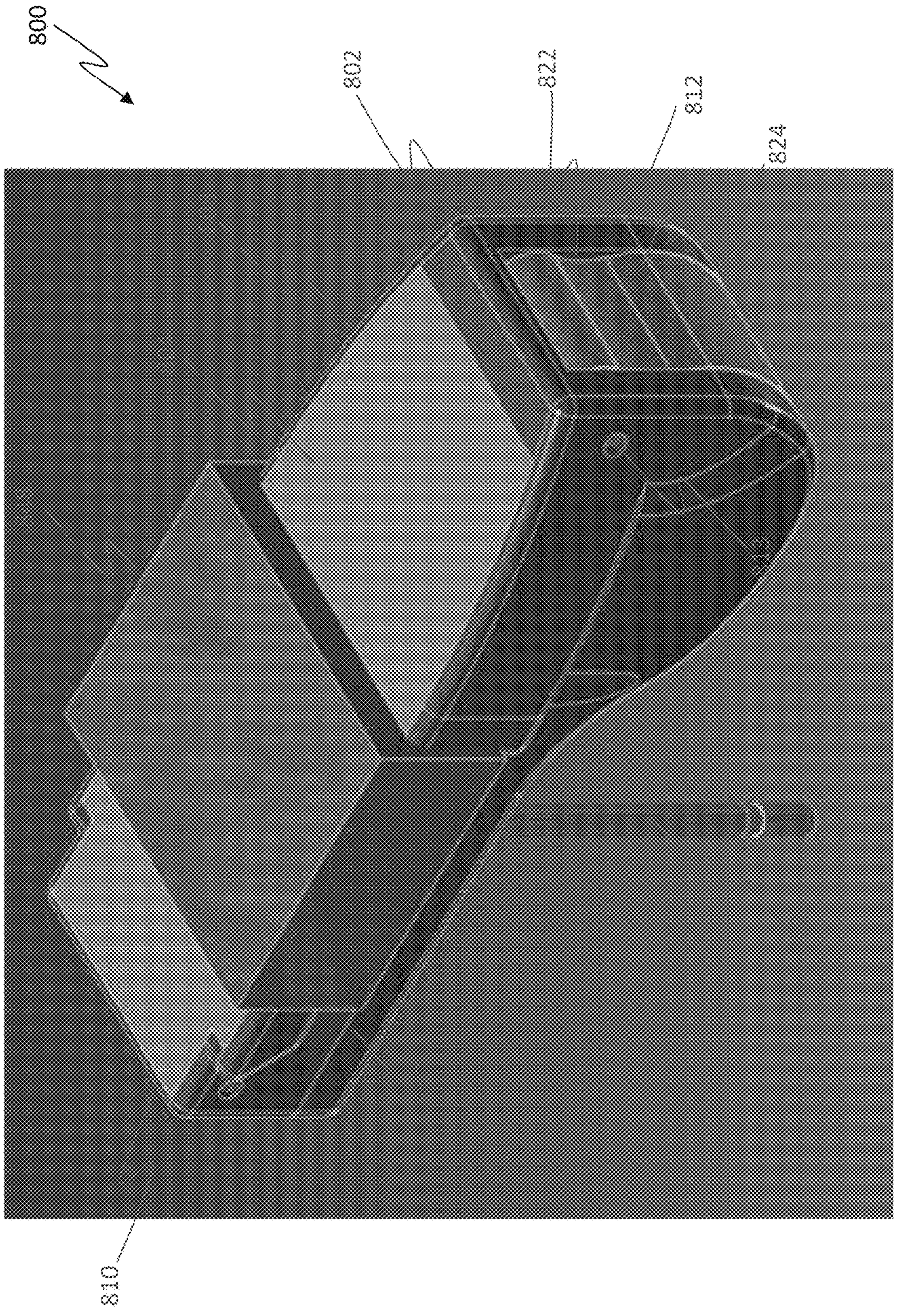
FIG. 15A is a bottom-up, front view of a PSAD, in accordance with still yet another embodiment of the invention.
Figure 15B:
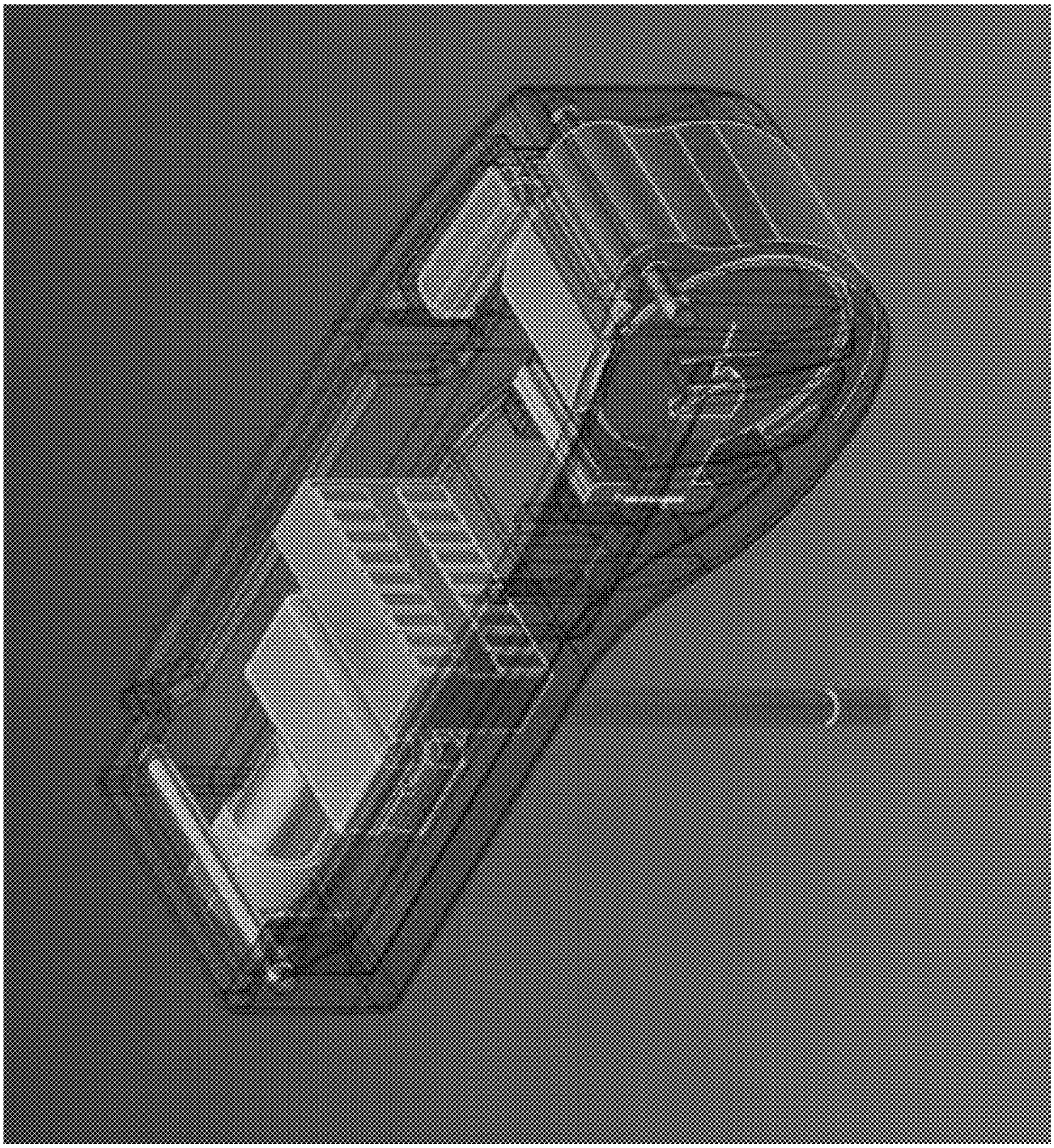
FIG. 15B is a bottom-up, front, cutaway view of the PSAD of FIG. 15A illustrating the internal components of the PSAD of FIG. 15A, in accordance with one embodiment of the invention.
Figure 15C:
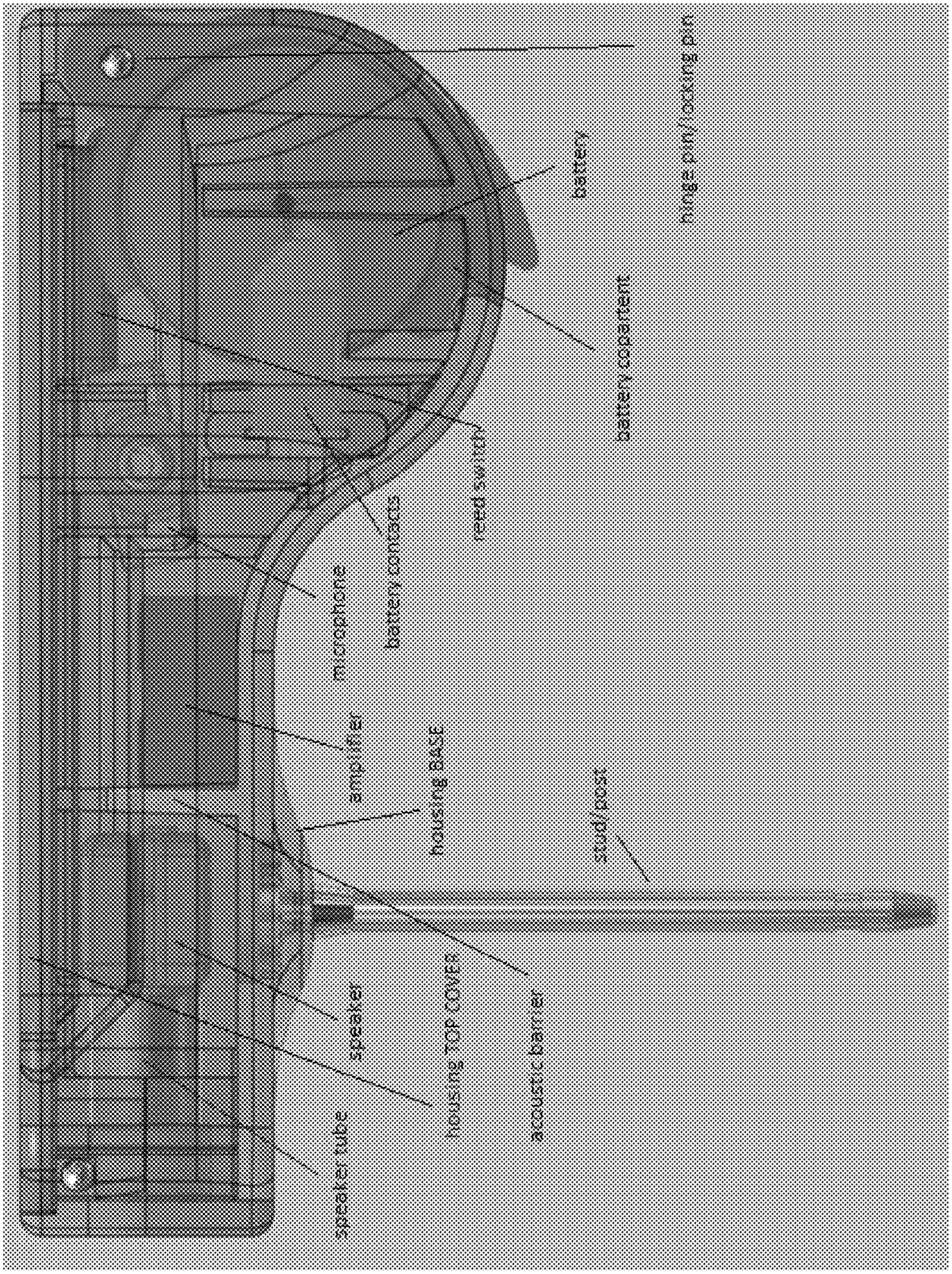
FIG. 15C is a side, cutaway view of the PSAD of FIG. 15A illustrating the internal components of the PSAD of FIG. 15A, in accordance with one embodiment of the invention.
Figure 16A:
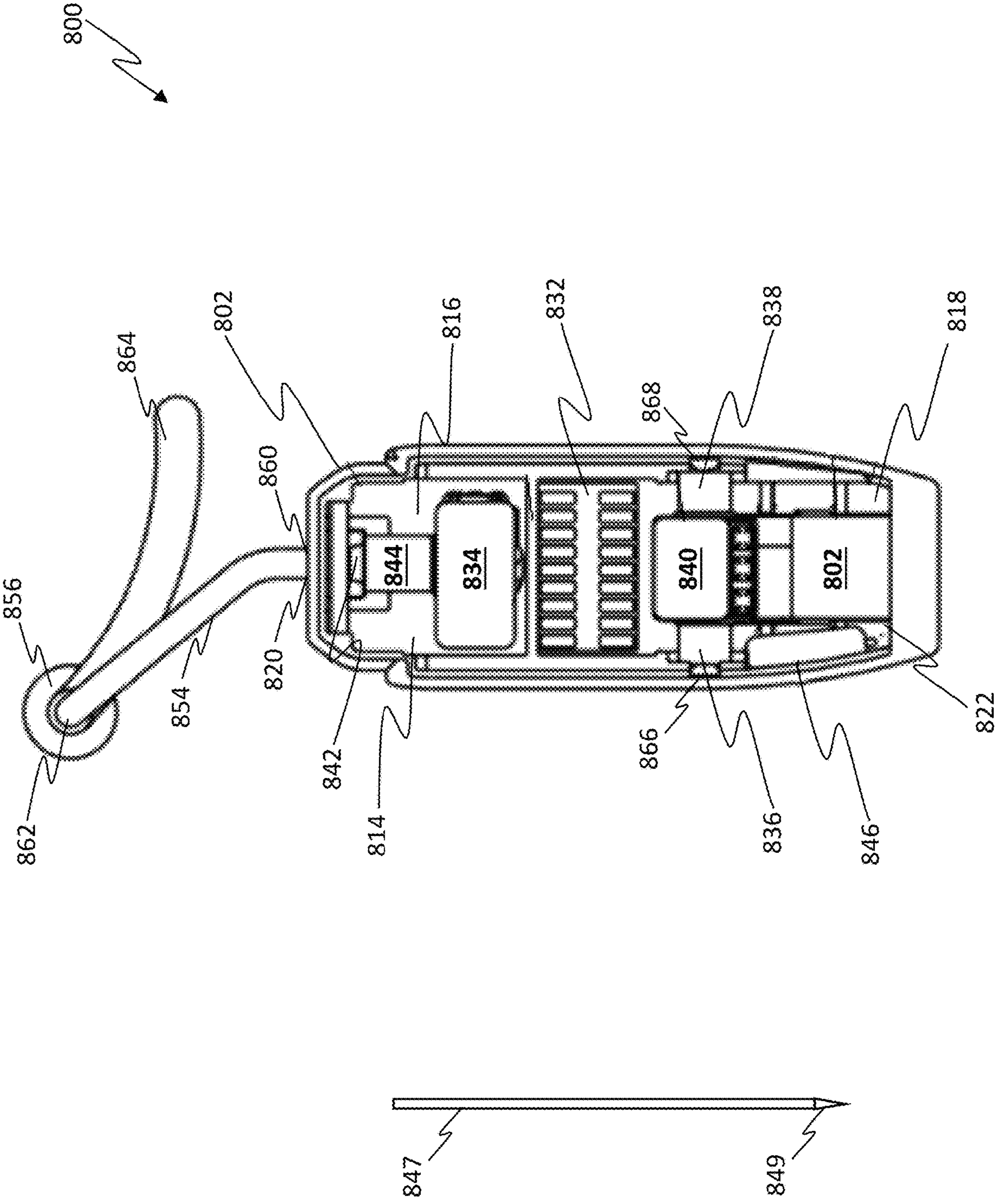
FIG. 16A is a cutaway, front view of the PSAD of FIG. 15A with a magnetic wand, in accordance with one embodiment of the invention.
Figure 16B:
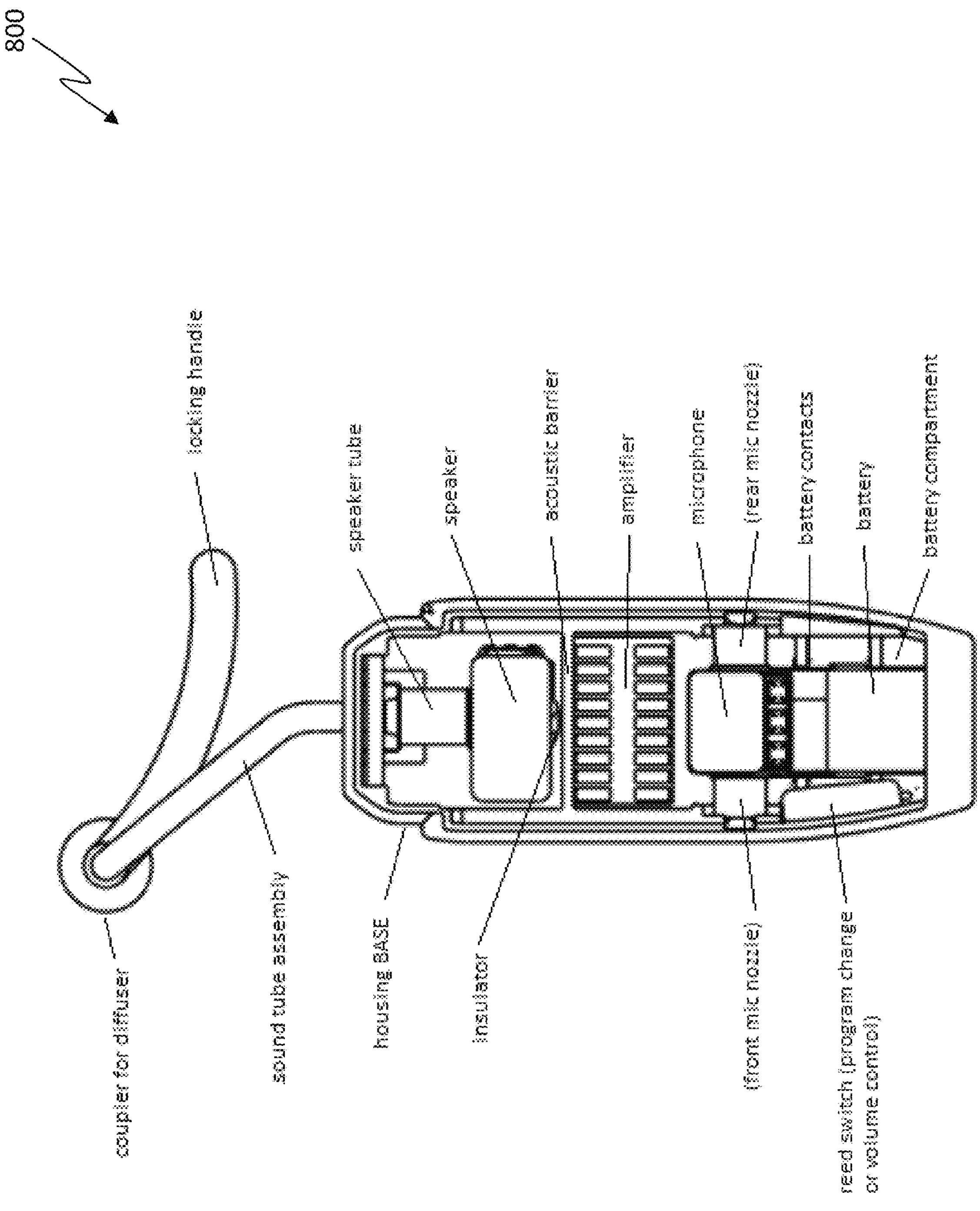
FIG. 16B is a cutaway, front view of the PSAD of FIG. 15A.
Figure 17A:
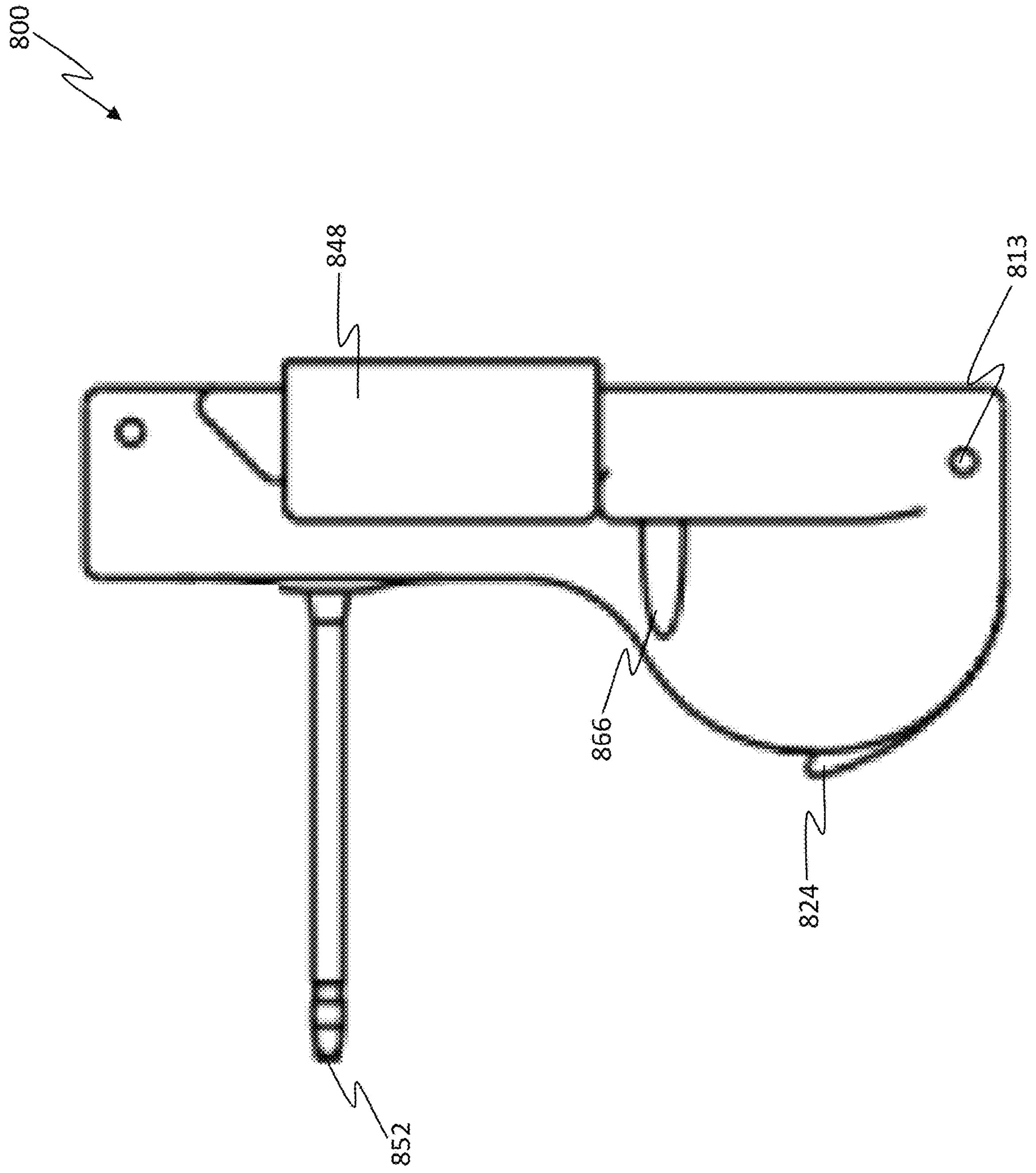
FIG. 17A is a side view of the PSAD of FIG. 15A having a jewelry slide, in accordance with one embodiment.
Figure 17B:
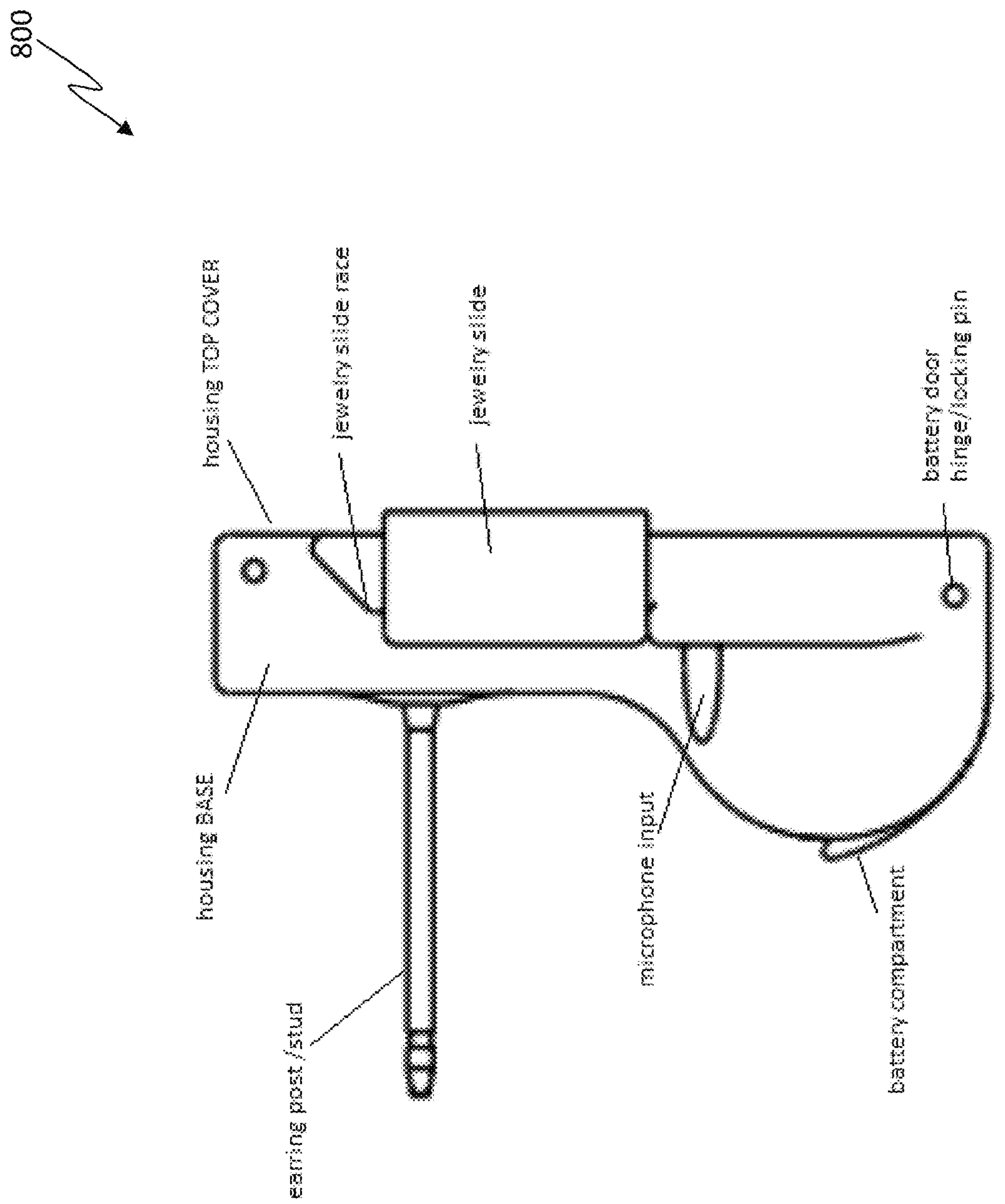
FIG. 17B is a side view of the PSAD of FIG. 17A.
Figure 17C:
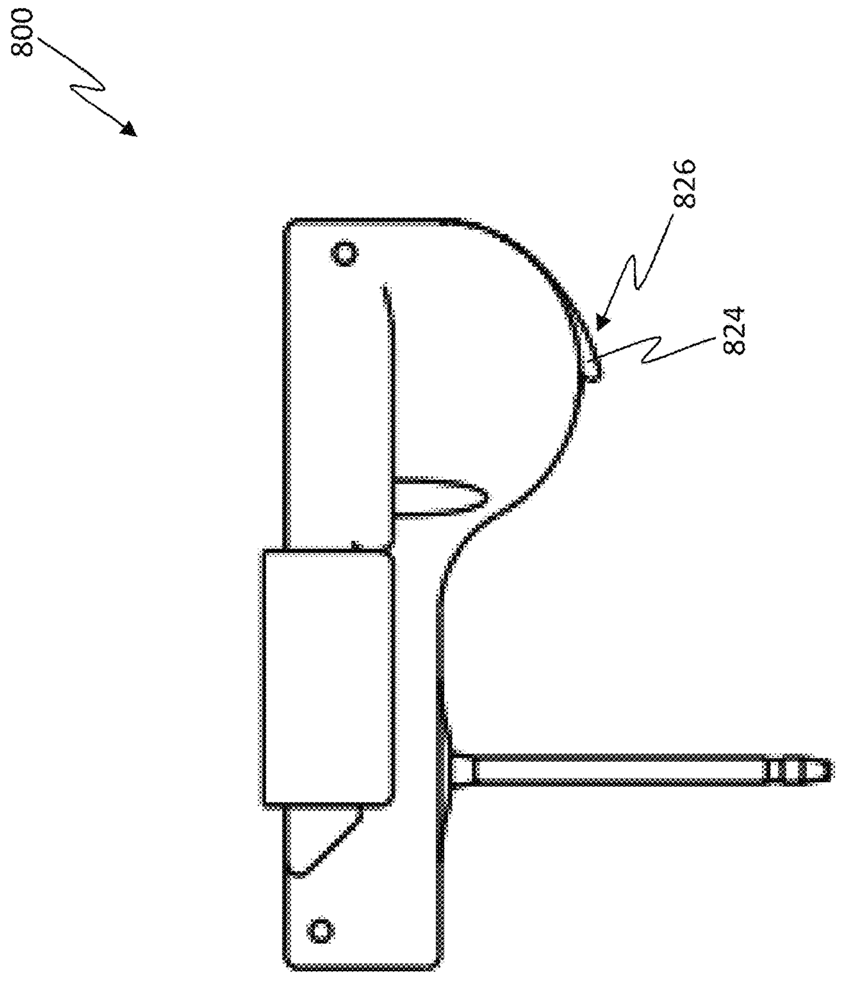
FIG. 17C is a side view of the PSAD of FIG. 17A with the PSAD battery cover configured into the first configuration.
Figure 17D:
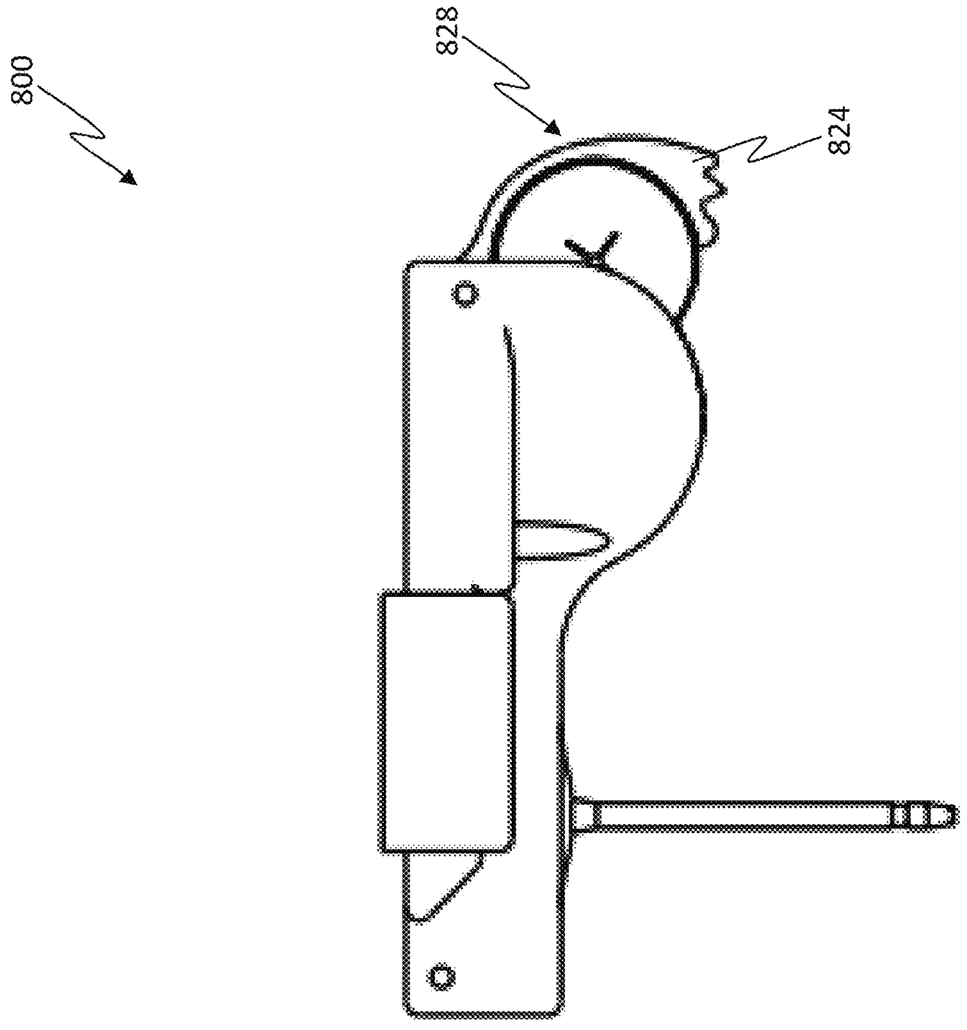
FIG. 17D is a side view of the PSAD of FIG. 17A with the PSAD battery cover configured into the second configuration.
Figures 18A, 18B, 18C, 18D:
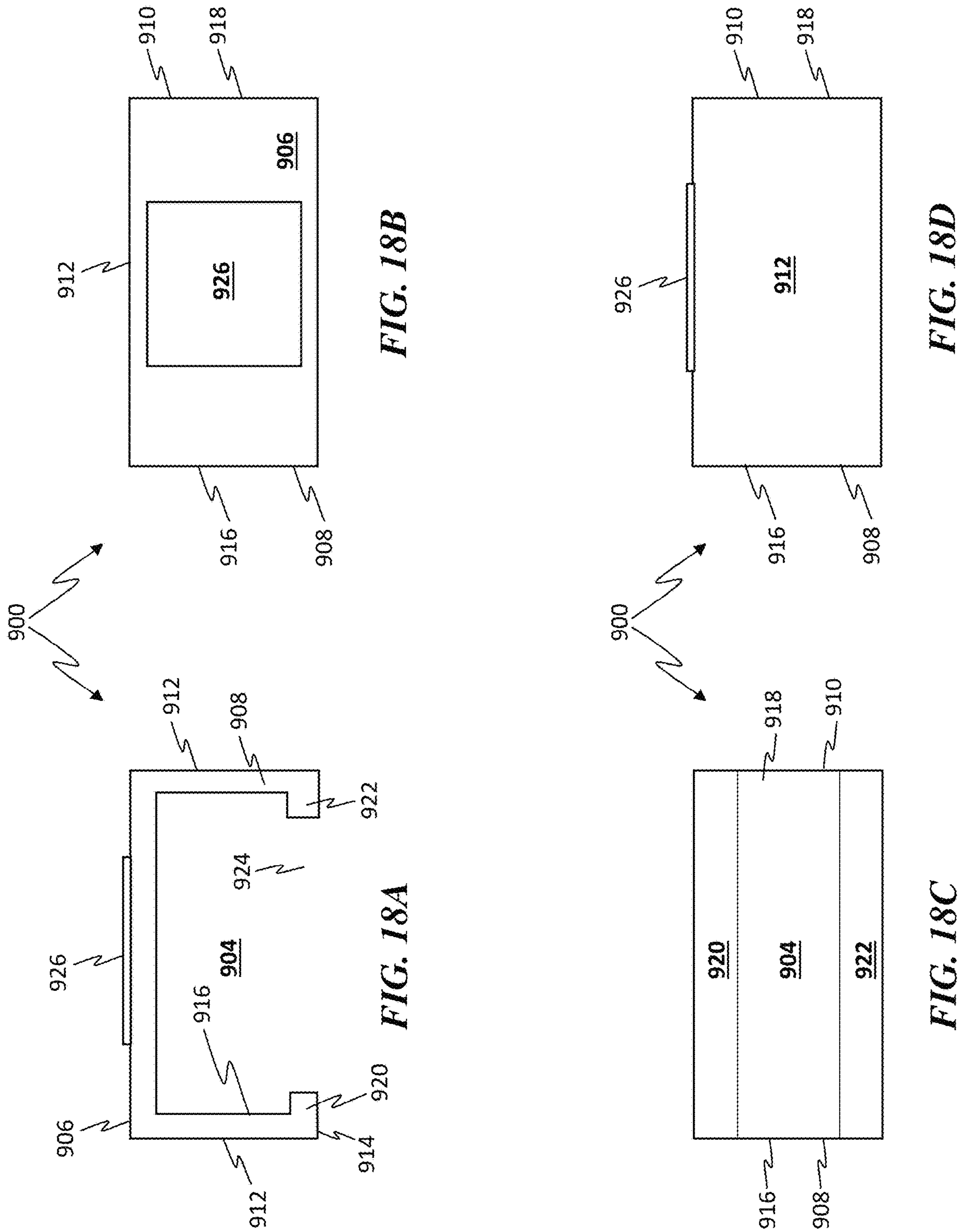
FIG. 18A is a front view of a jewelry slide for use with the PSAD of FIG. 15A, in accordance with one embodiment of the invention.
FIG. 18B is a top-down view of the jewelry slide of FIG. 18A.
FIG. 18C is a bottom-up view of the jewelry slide of FIG. 18A.
FIG. 18D is a side view of the jewelry slide of FIG. 18A.

Referring to FIG. 15A, FIG. 15B and FIG. 15C, another embodiment of a PSAD 800 is provided and includes a PSAD module body 802 having a PSAD module body front 804, a PSAD module body rear 806, PSAD module body sides 808, a PSAD module body top 810 and a PSAD module body bottom 812. Referring to FIG. 16A, FIG. 16B, FIG. 17A, FIG. 17B, FIG. 17C and FIG. 17D, it should be appreciated that the PSAD module body 802 defines a PSAD module body cavity 814 having an electronics cavity portion 816 for containing PSAD electronics and a battery cavity portion 818 for containing a PSAD power source. It should be further appreciated that the PSAD module body 802 defines a sound tube opening 820 located proximate the PSAD module body top 810, and a battery opening 822 located proximate the PSAD module body bottom 812. The PSAD module body 802 includes a PSAD battery cover 824 which is associated with the PSAD module body bottom 812 via a mounting pin 813 which allows the PSAD battery cover 824 to be rotatably configurable between a first configuration 826 (See FIG. 17C) and a second configuration 828 (See FIG. 17D). When the PSAD battery cover 824 is configured in the first configuration 826, the PSAD battery cover 824 is securely associated with the PSAD module bottom 812 to cover the battery opening 822 to prevent access to the battery cavity portion 818. When the PSAD battery cover 824 is configured in the second configuration 828, the PSAD battery cover 824 is located away from the PSAD module bottom 812 to uncover the battery opening 822 and to allow access to the battery cavity portion 818. It should be appreciated that the PSAD battery cover 824 may be securely associated with the PSAD via any device and/or method suitable to the desired end purpose, such as friction fit, clip, screw, magnet, etc.

The PSAD 800 may include one or more of a processing device (NOT SHOWN), an amplifier 832 (which may be integrated with the processing device as desired), a speaker 834, a front microphone nozzle tube 836 and a rear microphone nozzle tube 838 which are both communicated with a microphone 840, a sound output nozzle 842 associated with the sound tube opening 820 and with the speaker 834 via a sound tube 844, a reed switch 846 having a programming wand 847 with a wand magnetic tip 849 for programming (on/off, program change, volume change, etc.) the PSAD 800, a jewelry slide 848 for magnetically interacting with a decorative jewelry slide cover 850, and a PSAD ear post 852. It should be appreciated that the PSAD 800 further includes an external sound tube 854 and a diffuser 856, wherein the external sound tube 854 defines an external sound tube cavity 858 which communicates a first end opening 860 with a second end opening 862. It should be appreciated that the first end opening 860 is associated with the sound tube opening 820 and the second end opening 862 is associated with the diffuser 856. The PSAD 800 further includes a locking handle 864 which may be associated with the diffuser 856 to allow the diffuser 856 to be securely associated with the ear of a wearer. This advantageously allows sound emitted from the sound tube 844 to enter the first end opening 860, travel through the external sound tube 854, out of the second end opening 862 and into the ear of a wearer.

The PSAD 800 further defines a front microphone opening 866 and a rear microphone opening 868, wherein the front microphone opening 866 is associated with the front microphone nozzle tube 836 and the rear microphone opening 868 is associated with the rear microphone nozzle tube 838. This advantageously allows sound to enter the front microphone opening 866 and/or the rear microphone opening 868, travel through the front microphone nozzle tube 836 and the rear microphone nozzle tube 838, respectively, and into the microphone 840. As briefly discuss hereinabove, it should be appreciated that the PSAD 800 may be turned on by locating the magnetic wand tip 849 proximate the reed switch 846. Reed switches 846 are a magnetically activated momentary contact switch which is typically in the 'switch open' configuration and electricity is not allowed to flow through it. When a magnet (such as the magnetic wand tip 849) is placed proximate to the reed switch 846, the reed switch 846 is configured into the 'switch closed' configuration which allows electricity to flow through it to activate a function in the PSAD 800, such as change volume level, and/or program/memory and/or on/off. It should be appreciated that the reed switch 846 in the PSAD 800 may be configured to implement one or more functions and/or multiple reed switches 846 may be used. Additionally, various other kinds of switches that don't operated via magnets (rather mechanical and/or electrical switches) may also be used as desired.

Figure 19B:
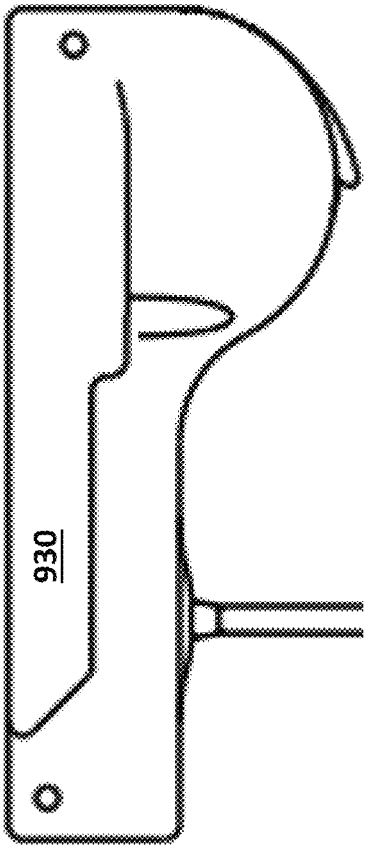
FIG. 19B is a side view of the PSAD of FIG. 15A.
Figure 19A:
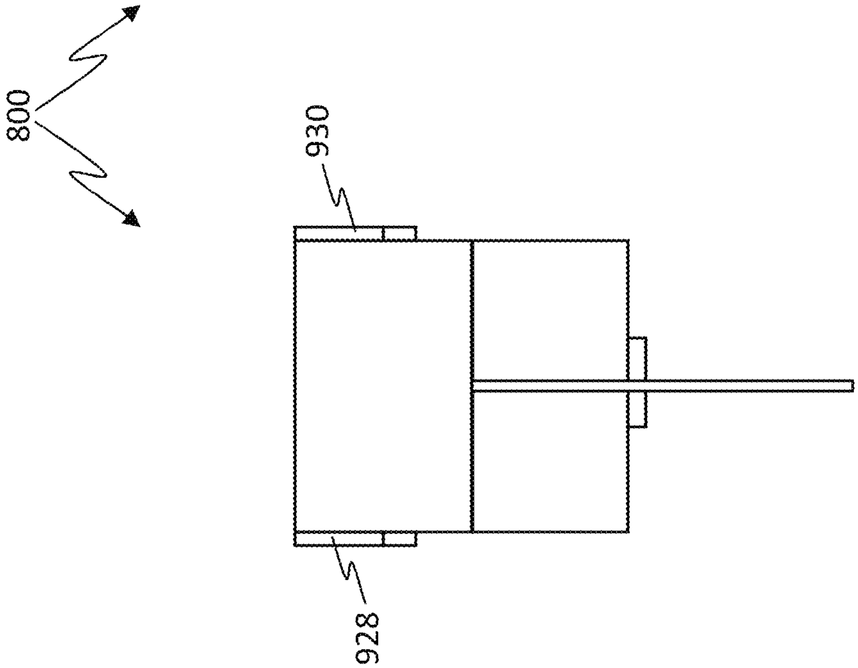
FIG. 19A is a top view of the PSAD of FIG. 15A.

Referring to FIG. 18A, FIG. 18B, FIG. 18C and FIG. 18D jewelry slide 900 is shown, in accordance with one embodiment of the invention, and includes a slide structure 902 defining a slide cavity 904 and having a slide top 906, a slide front 908, a slide rear 910, slide sides 912 and a slide bottom 914. The slide front 908 defines a slide front opening 916 and the slide rear 910 defines a slide rear opening 918. Additionally, the slide bottom 914 includes a first slide bottom flange 920 and a second slide bottom flange 922 and defines a slide bottom opening 924, wherein the slide front opening 916, slide rear opening 918 and slide bottom opening 924 are communicated with the slide cavity 904. Moreover, the slide top 906 may include an attachment article 926 which allows a decorative earring cover to be removably attached to the slide top 906. It should be appreciated that the attachment article 926 may be any attachment article 926 desired suitable to the desired end purpose, such as a magnet, a clip, an adhesive, a snap, etc. Referring to FIG. 19A, the PSAD module body 802 defines a first slide engagement flange 928 located on one of the PSAD module body sides 808 and a second slide engagement flange 930 located on the opposite side of the PSAD module body sides 808, wherein the first slide engagement flange 928 are configured to associate with the first slide bottom flange 920 and second slide bottom flange 922 of the jewelry slide 900 when the jewelry slide 900 is associated with PSAD module body 802.

Figure 20:
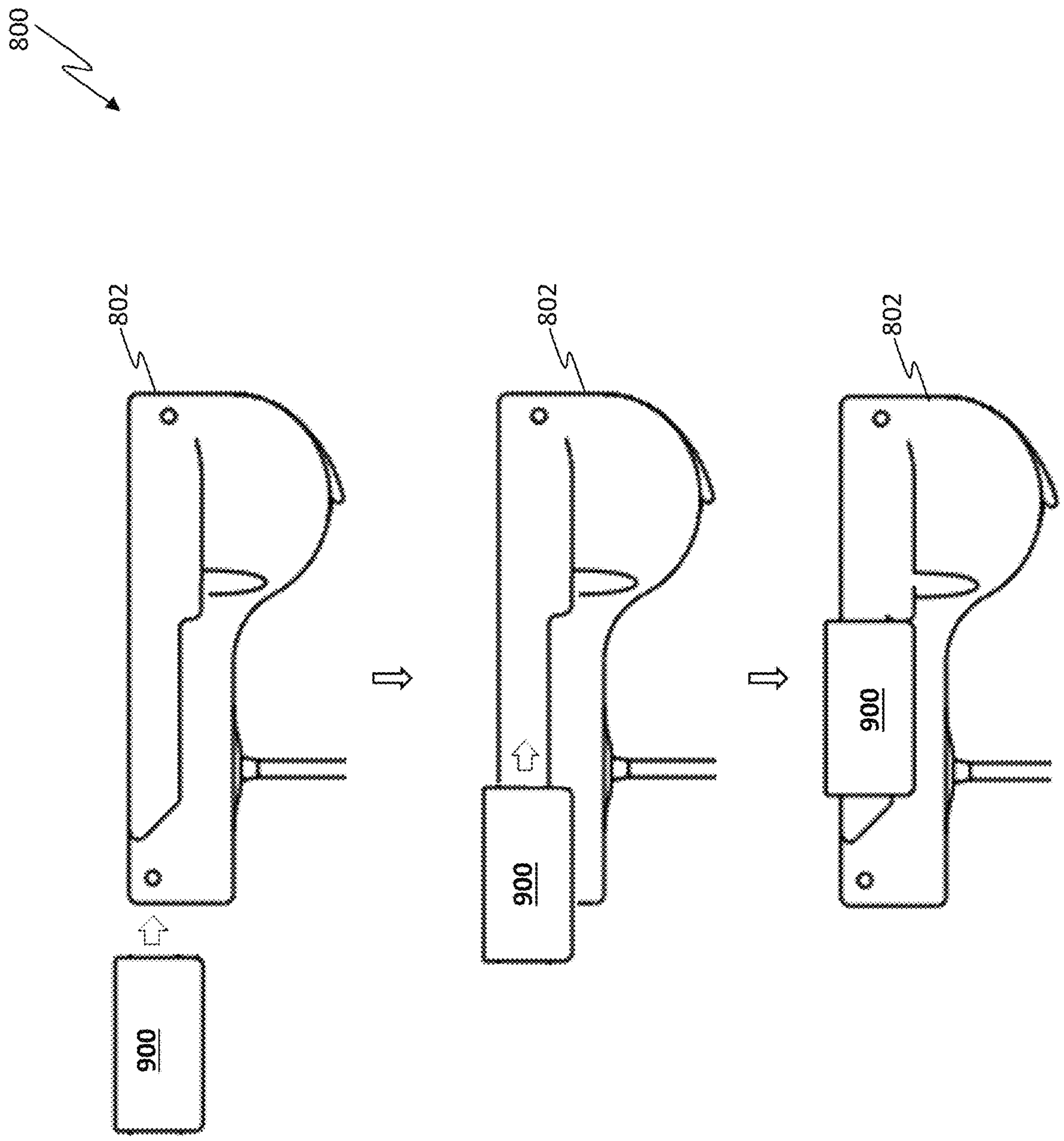
FIG. 20 is a side view of the jewelry slide of FIG. 18A being associated with the PSAD of FIG. 15A, in accordance with one embodiment.

Referring to FIG. 20, the jewelry slide 900 may be associated with the PSAD module body 802 by inserting the PSAD module body top 810 into the slide rear 910 such that the PSAD module body front 804 is proximate the slide top 904. It should be appreciated that a portion of the first slide engagement flange 928 and the second slide engagement flange 930 are located with the slide cavity 904 to be adjacent the first slide bottom flange 920 and second slide bottom flange 922, respectively. The PSAD module body 802 should be positioned within the slide cavity 904 such that the PSAD module body top 810 is protruding out of the slide front 908 and such that the slide rear 910 is proximate the end of the first slide engagement flange 928 and the second slide engagement flange 930. It should be appreciated that the PSAD module body 802 may be snugly contained within the slide cavity 904 such that the jewelry slide 900 and the PSAD module body 802 are securely associated. It should also be appreciated that, in other embodiments, the jewelry slide 900 may be integrated with the rear portion of a jewelry cover (i.e. earing jewelry).

Figure 21:
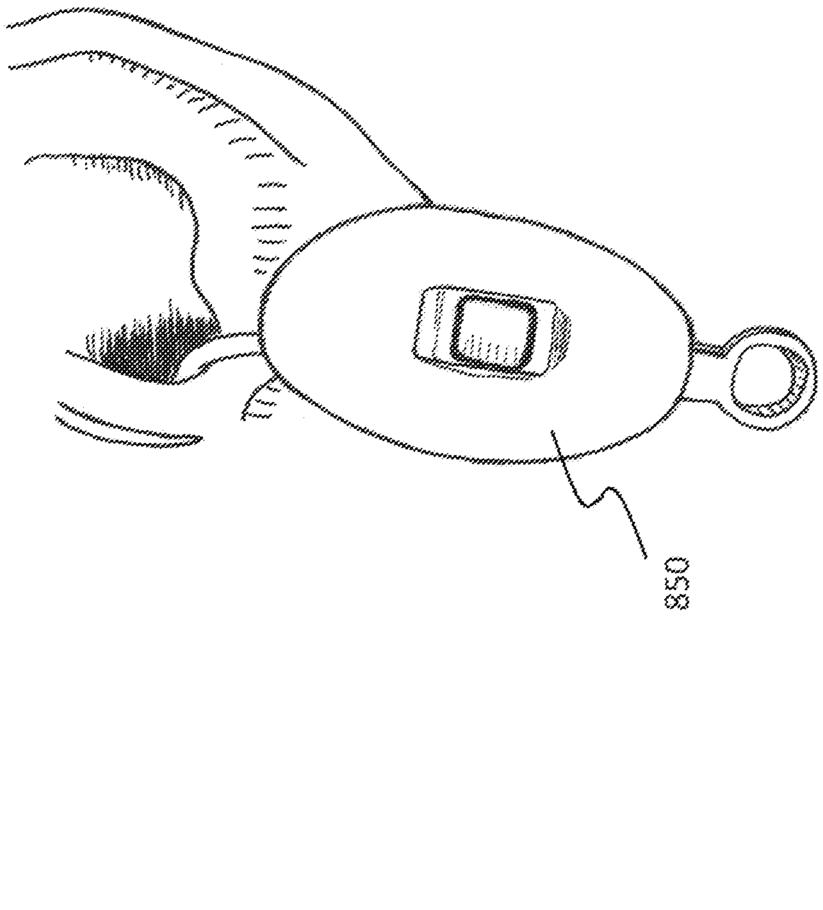
FIG. 21 is a front, side view of a person wearing the PSAD of FIG. 15A, in accordance with one embodiment of the invention.
Figure 22:
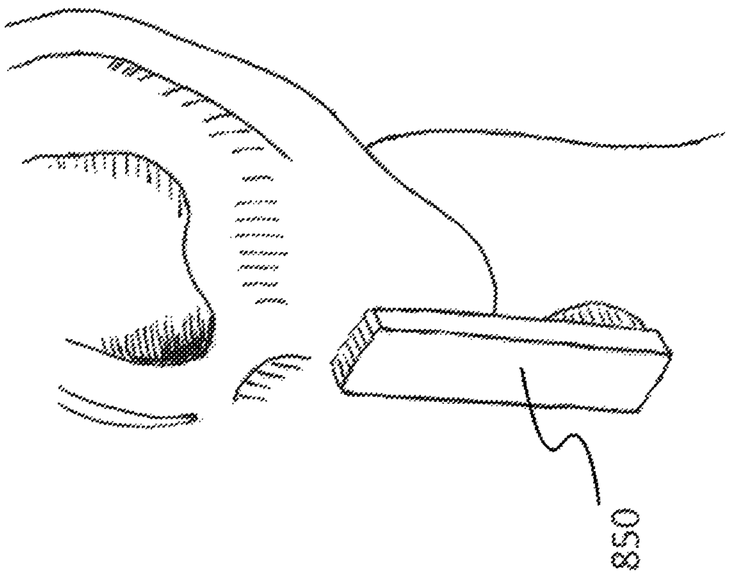
FIG. 22 is a front, side view of a person wearing the PSAD of FIG. 15A, in accordance with another embodiment of the invention.

It should be further appreciated that other devices and/or methods of securely associating the jewelry slide 900 and the PSAD module body 802 may be used as desired suitable to the desired end purpose, such as a clip, screw, etc. Additionally, it should be appreciated that the PSAD 800 may be configured to securely contain and operate with any type of hearing device battery as desired suitable to the desired end purpose, such as a zinc-air #10 hearing aid battery, a lithium-ion rechargeable battery, etc. Moreover, it is contemplated that in other embodiments, the PSAD 800 may be configured to contain rechargeable battery/energy cell that may be recharged via a wired or wireless charger without removing the battery/energy cell from the PSAD 800. Referring to FIG. 21, the PSAD of FIG. 15A and FIG. 15B is shown being worn by a wearer, in accordance with one embodiment. Referring to FIG. 22, the PSAD of FIG. 15A and FIG. 15B is shown being worn by a wearer, in accordance with another embodiment.

While the invention has been described with reference to an exemplary embodiment, it should be understood by those skilled in the art that various changes may be made and equivalents may be substituted for elements thereof without departing from the scope of the invention. Moreover, the embodiments or parts of the embodiments may be combined in whole or in part without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

We claim:

1. A Personal Sound Amplification System comprising:

a Personal Sound Amplification Device (PSAD), wherein the PSAD includes, a PSAD module body having a PSAD module body front, a PSAD module body rear, PSAD module body sides, a PSAD module body top and a PSAD module body bottom, wherein the PSAD module body defines a PSAD module body cavity for containing PSAD electronics and PSAD power source;

at least one PSAD microphone configured to receive a sound input and generate a microphone signal;

a PSAD amplifier configured to receive the microphone signal and generate a processed microphone signal;

a PSAD speaker configured to receive the processed microphone signal and generate a sound output;

an external sound tube, wherein the external sound tube is associated with the PSAD module body top of the PSAD module body;

a sound diffuser, wherein the external sound tube communicates the PSAD speaker with the sound diffuser; and a jewelry attachment device, wherein the jewelry attachment device is slidably associated with the PSAD module body front and configured to magnetically associate with a decorative jewelry cover.

2. The Personal Sound Amplification System of claim 1, wherein the PSAD electronics include at least one of a processing device, a sound output nozzle associate with the PSAD speaker, and at least one switch configured for programming at least one of the tone and volume of the PSAD.

3. The Personal Sound Amplification System of claim 2, further comprising a magnetic wand, wherein the PSAD is configured to be at least partially controlled via the magnetic wand.

4. The Personal Sound Amplification System of claim 3, wherein the at least one switch is a magnetic switch configured to program at least one of the tone and volume of the PSAD when the magnetic wand is located proximate to the magnetic switch.

5. The Personal Sound Amplification System of claim 1, wherein the at least one PSAD microphone includes a first PSAD microphone and a second PSAD microphone, and wherein the PSAD module body includes, a first PSAD microphone receiving port associated with the first PSAD microphone, and a second PSAD microphone receiving port associated with the second PSAD microphone.

6. The Personal Sound Amplification System of claim 1, wherein the jewelry attachment device is removably and slidably associated with the PSAD module body front.

7. The Personal Sound Amplification System of claim 1, wherein the jewelry attachment device includes an attachment article, wherein the decorative jewelry cover is configured to magnetically associate with the attachment article.

8. The Personal Sound Amplification System of claim 1, wherein the PSAD module body cavity includes an electronics cavity portion for containing the PSAD electronics, and a battery cavity portion for containing the PSAD power source.

9. The Personal Sound Amplification System of claim 8, further comprising a PSAD ear post associated with the PSAD module body rear to extend out of and away from the PSAD module body rear.

10. The Personal Sound Amplification System of claim 9, further comprising a PSAD battery cover rotatably configurable between a first configuration and a second configuration, wherein when the PSAD battery cover is configured into the first configuration, the PSAD battery cover is associated with the PSAD module body to enclose the battery within the battery cavity portion, and when the PSAD battery cover is configured into the second configuration, the PSAD battery cover is located away from the PSAD module body to allow access to the battery cavity portion.

11. A Personal Sound Amplification System comprising:

a Personal Sound Amplification Device (PSAD), wherein the PSAD includes, a PSAD module body which defines a PSAD module body cavity for containing PSAD electronics, wherein the PSAD electronics include at least one PSAD microphone configured to receive a sound input and generate a microphone signal, a PSAD amplifier configured to receive the microphone signal and generate a processed microphone signal and a PSAD speaker configured to receive the processed microphone signal and generate a sound output;

an external sound tube, wherein the external sound tube is associated with the PSAD module body;

a sound diffuser, wherein the sound diffuser receives sound from the PSAD speaker; and a jewelry attachment device, wherein the jewelry attachment device is slidably associated with the PSAD module body front and configured to magnetically associate with a decorative jewelry cover.

12. The Personal Sound Amplification System of claim 11, wherein the PSAD module body cavity includes an electronics cavity portion for containing the PSAD electronics, and a battery cavity portion for containing the PSAD power source.

13. The Personal Sound Amplification System of claim 11, wherein the PSAD electronics include at least one of a processing device, a sound output nozzle associate with the PSAD speaker, and at least one switch configured for programming at least one of the tone and volume of the PSAD.

14. The Personal Sound Amplification System of claim 11, wherein the external sound tube communicates the PSAD speaker with the sound diffuser.

15. The Personal Sound Amplification System of claim 11, wherein the at least one PSAD microphone includes a first PSAD microphone and a PSAD second microphone, and wherein the PSAD module body includes, a first PSAD microphone receiving port associated with the first PSAD microphone, and a second PSAD microphone receiving port associated with the second PSAD microphone.

16. The Personal Sound Amplification System of claim 11, wherein the jewelry attachment device is removably and slidably associated with the PSAD module body front.

17. The Personal Sound Amplification System of claim 11, wherein the jewelry attachment device includes an attachment article, wherein the decorative jewelry cover is configured to magnetically associate with the attachment article.

18. The Personal Sound Amplification System of claim 11, further comprising a PSAD battery cover rotatably configurable between a first configuration and a second configuration, wherein when the PSAD battery cover is configured into the first configuration, the PSAD battery cover is associated with the PSAD module body to enclose the battery within the battery cavity portion, and when the PSAD battery cover is configured into the second configuration, the PSAD battery cover is located away from the PSAD module body to allow access to the battery cavity portion.

19. The Personal Sound Amplification System of claim 11, further comprising a magnetic wand, wherein the PSAD is configured to be at least partially controlled via the magnetic wand, and wherein the at least one switch is a magnetic switch configured to program at least one of the tone and volume of the PSAD when the magnetic wand is located proximate to the magnetic switch.

20. A Personal Sound Amplification System comprising:

a Personal Sound Amplification Device (PSAD) having a PSAD module body which defines a PSAD module body cavity for containing PSAD electronics and PSAD power source;

at least one PSAD microphone configured to receive a sound input and generate a microphone signal;

a PSAD speaker configured to receive the processed microphone signal and generate a sound output;

a sound diffuser, wherein the sound diffuser receives sound from the PSAD speaker; and a jewelry attachment device, wherein the jewelry attachment device is associated with the PSAD module body and configured to removably associate with a decorative jewelry cover configured to cover a portion of the PSAD module body.

* * * * *